(12) United States Patent
Kondo et al.

(10) Patent No.: US 8,077,214 B2
(45) Date of Patent: Dec. 13, 2011

(54) SIGNAL PROCESSING APPARATUS, SIGNAL PROCESSING METHOD, PROGRAM AND RECORDING MEDIUM

(75) Inventors: Tetsujiro Kondo, Tokyo (JP); Tetsushi Kokubo, Kanagawa (JP); Kenji Tanaka, Kanagawa (JP); Hitoshi Mukai, Kanagawa (JP); Kazumasa Tanaka, Chiba (JP); Hiroyuki Morisaki, Tokyo (JP); Hirofumi Hibi, Kanagawa (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/479,214

(22) Filed: Jun. 5, 2009

(65) Prior Publication Data

US 2009/0322891 A1    Dec. 31, 2009

(30) Foreign Application Priority Data

Jun. 27, 2008    (JP) ................................. 2008-169445

(51) Int. Cl.
*H04N 5/228* (2006.01)
*H04N 5/225* (2006.01)

(52) U.S. Cl. ................................. 348/218.1; 348/222.1

(58) Field of Classification Search ............... 348/222.1, 348/218.1
See application file for complete search history.

(56) References Cited

U.S. PATENT DOCUMENTS

| | | | | |
|---|---|---|---|---|
| 7,145,596 B2 * | 12/2006 | Kitaguchi et al. | ......... | 348/218.1 |
| 7,151,801 B2 | 12/2006 | Grossberg et al. | | |
| 7,307,654 B2 * | 12/2007 | Chang | ........................ | 348/218.1 |
| 2005/0219642 A1 | 10/2005 | Yachida et al. | | |
| 2006/0215038 A1 * | 9/2006 | Gruber et al. | .............. | 348/218.1 |
| 2008/0225129 A1 * | 9/2008 | Viinikanoja et al. | ........ | 348/218.1 |

FOREIGN PATENT DOCUMENTS

| | | |
|---|---|---|
| JP | 7-143439 | 6/1995 |
| JP | 9-139878 | 5/1997 |
| JP | 2004-135209 | 4/2004 |
| JP | 2005-522108 | 7/2005 |
| JP | 2005-318548 | 11/2005 |

* cited by examiner

*Primary Examiner* — James Hannett
(74) *Attorney, Agent, or Firm* — Oblon, Spivak, McClelland, Maier & Neustadt, L.L.P.

(57) ABSTRACT

A signal processing apparatus includes: an input unit receiving a first image generated by a first camera and higher-resolution second images generated by a plurality of second cameras; a similar portion detecting unit detecting a similar portion between part of a subject included in the first image and a subject included in each of the second images; an image synthesizing unit pasting the second images at positions corresponding to the detected similar portions within the first image to generate a synthesized image; an imaging area detecting unit detecting an area, for which image information is insufficient in the first image and is difficult to complement by the second cameras, as a non-imageable area from the synthesized image; and a camera parameter calculation unit changing a camera parameter for controlling the second camera that captures the second image by which the image information insufficient in the first image is complemented.

11 Claims, 28 Drawing Sheets

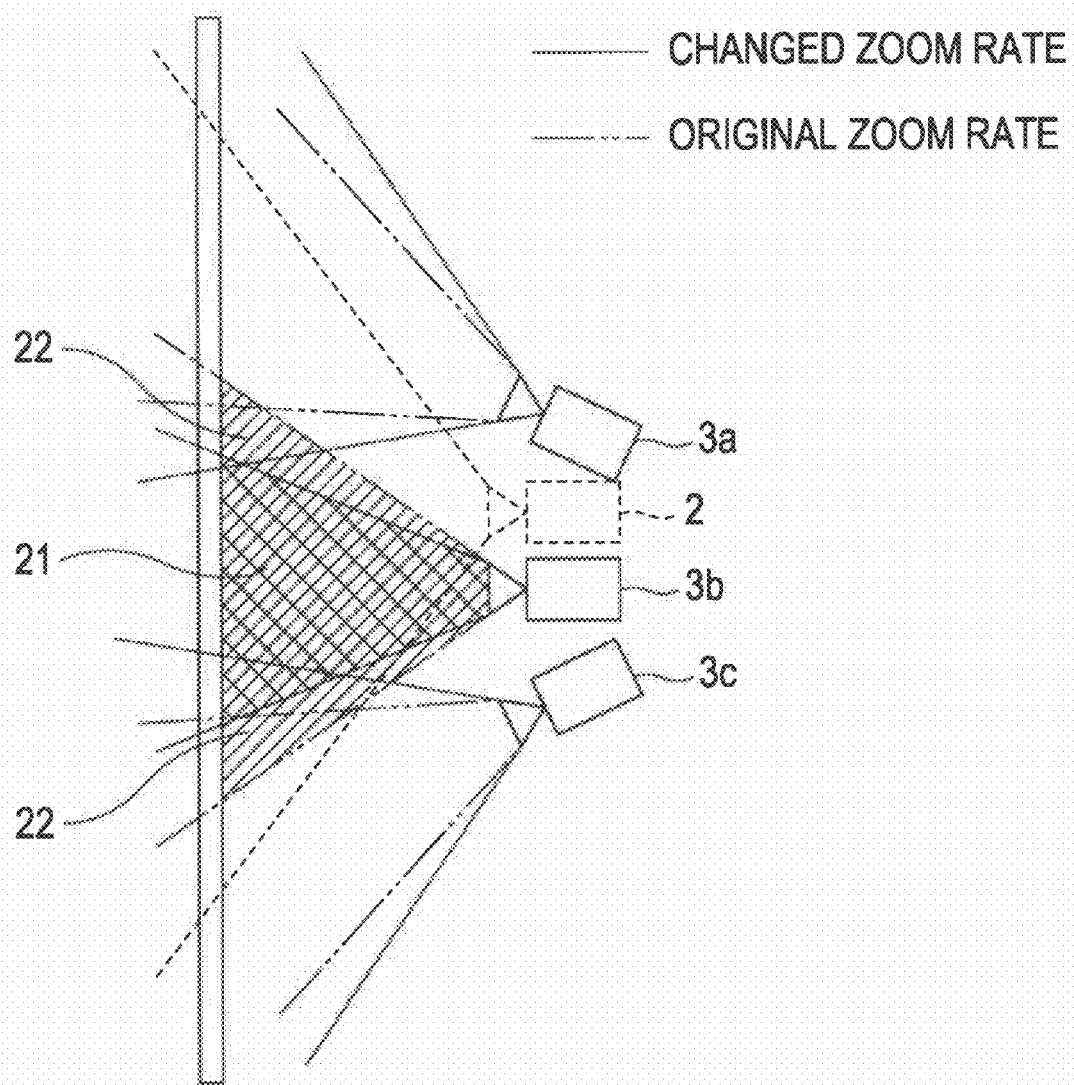

FIG. 5A

|  | FIRST CAMERA | SECOND CAMERA |
|---|---|---|
| RESOLUTION | LOW RESOLUTION | HIGH RESOLUTION |
| EYEPOINT | COMMON INFORMATION | PARALLAX IS PRESENT |
| CHROMATICNESS | COMMON INFORMATION | INDIVIDUAL INFORMATION |
| LUMINANCE | COMMON INFORMATION | INDIVIDUAL INFORMATION |
| FOCUS | COMMON INFORMATION | INDIVIDUAL INFORMATION |

FIG. 5B

|  | GENERATED IMAGE |
|---|---|
| RESOLUTION | HIGH RESOLUTION EQUIVALENT TO THAT OF SECOND CAMERA |
| EYEPOINT | SINGLE VIEWPOINT THAT COINCIDES WITH VIEWPOINT OF FIRST CAMERA |
| CHROMATICNESS | COLOR INFORMATION MORE DETAILED THAN COLOR OF FIRST CAMERA |
| LUMINANCE | LUMINANCE INFORMATION MORE DETAILED THAN LUMINANCE OF FIRST CAMERA |
| FOCUS | ADJUST FOCUS FOR EACH IMAGING AREA |

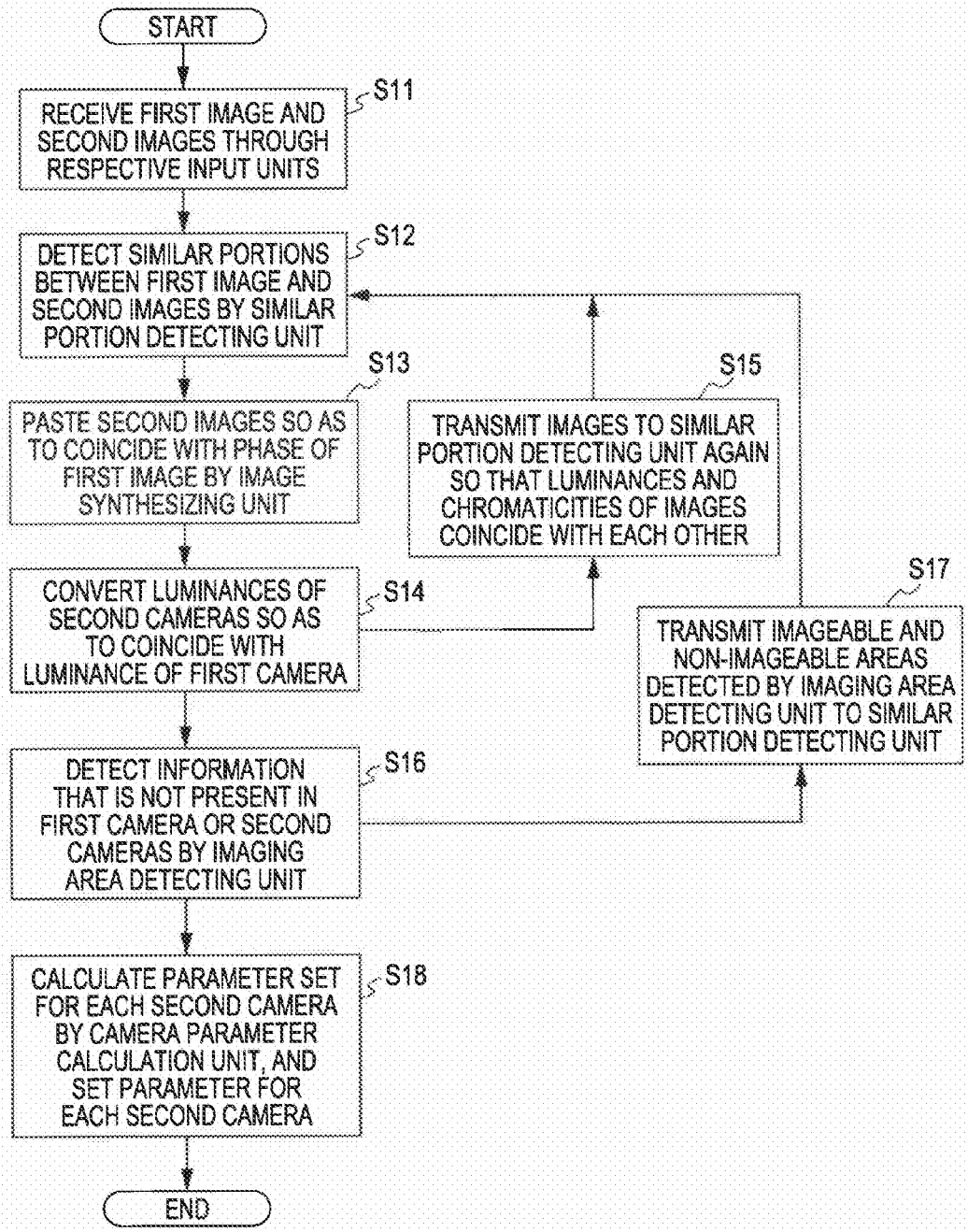

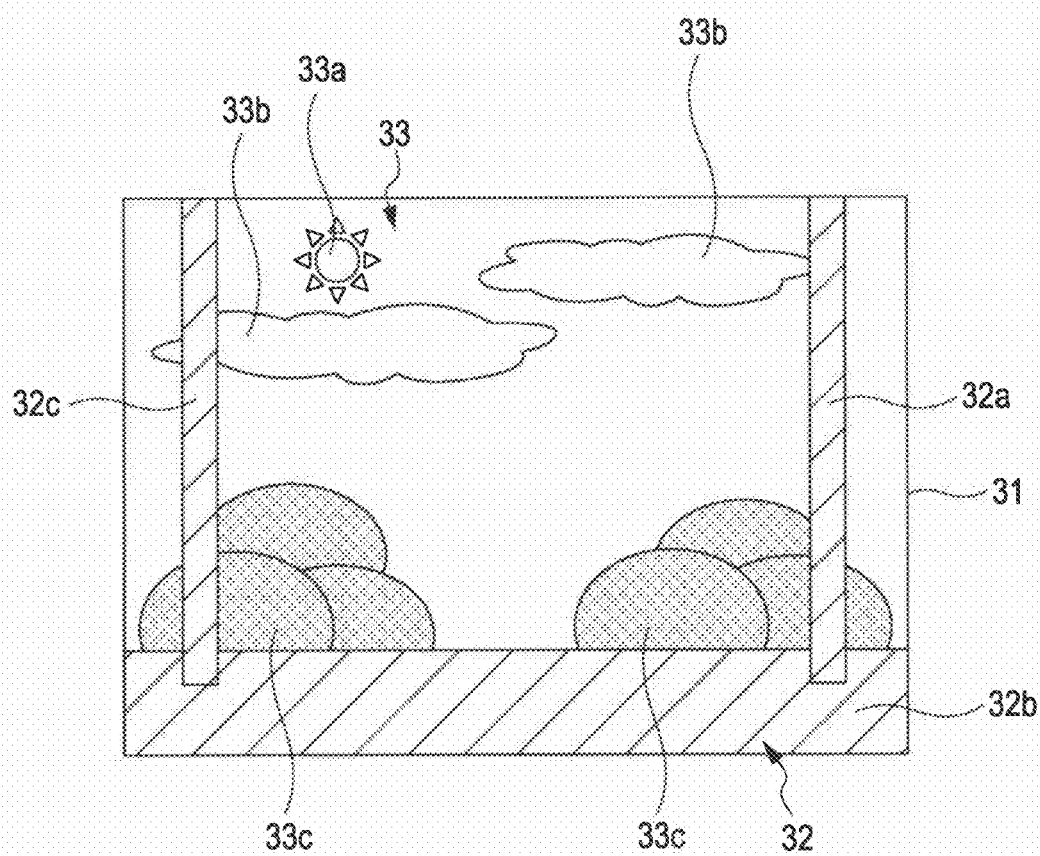

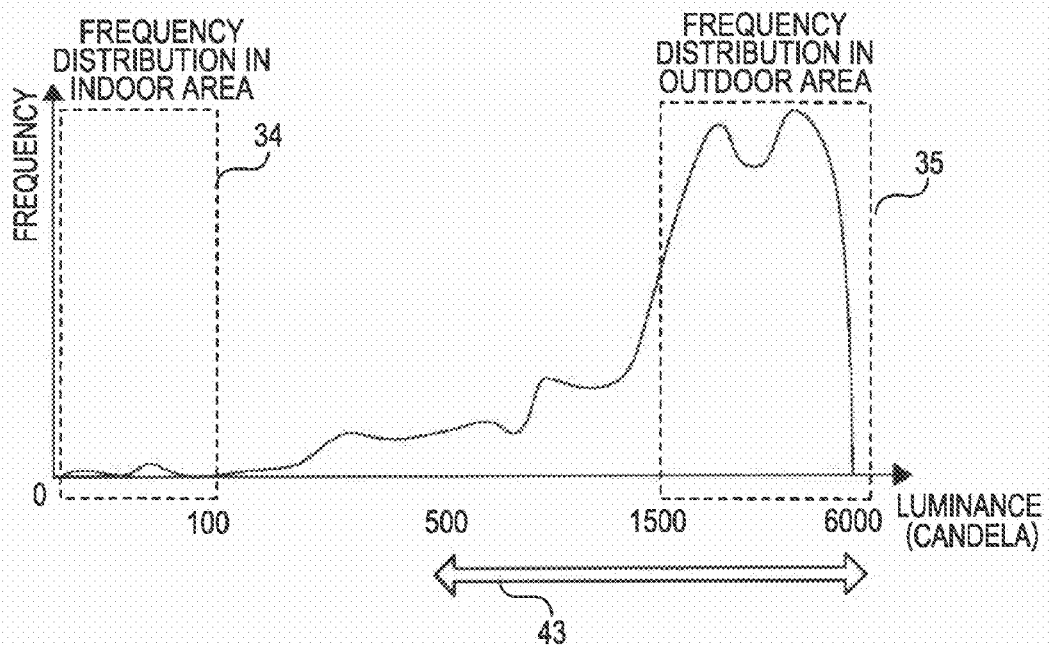
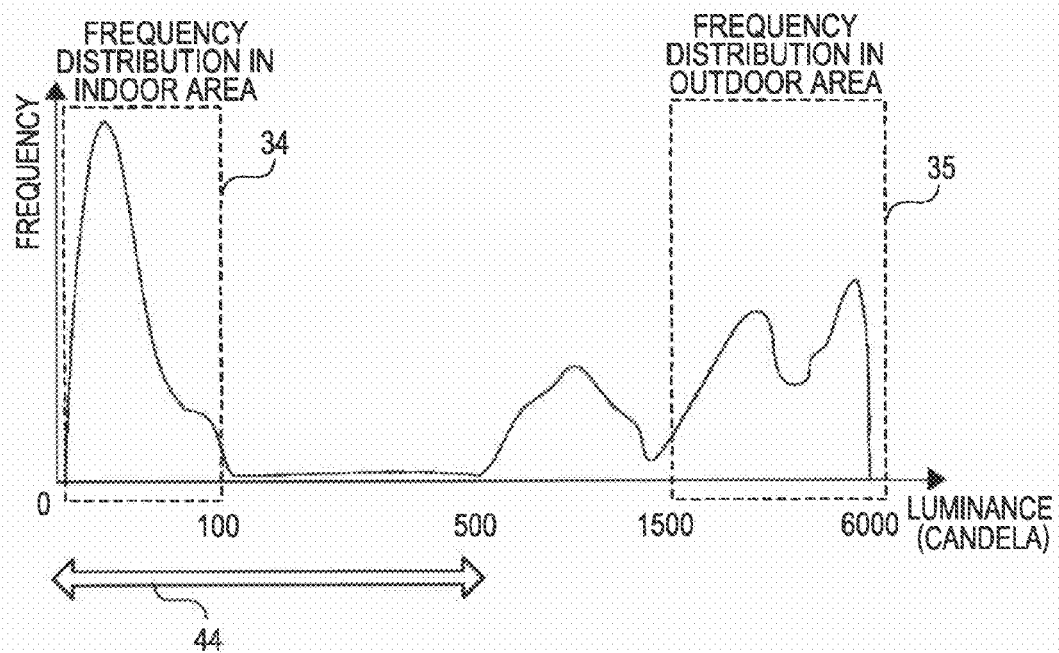

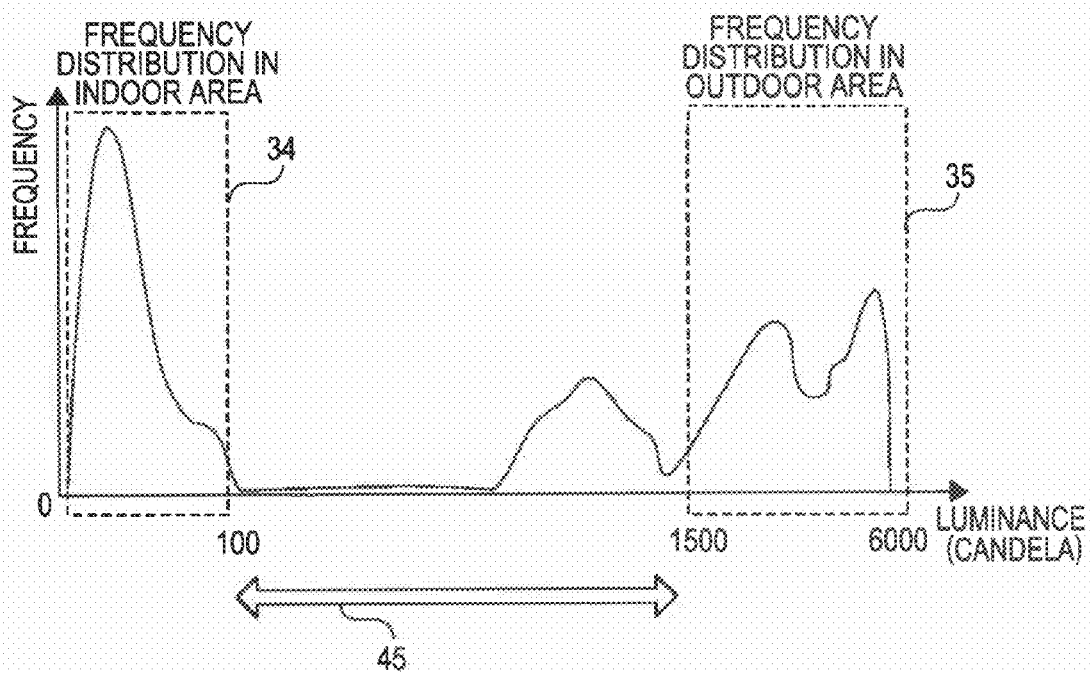

☐ NON-IMAGEABLE AREA
▦ IMAGEABLE AREA

☐ NON-IMAGEABLE AREA
▦ IMAGEABLE AREA

☐ NON-IMAGEABLE AREA
▦ IMAGEABLE AREA

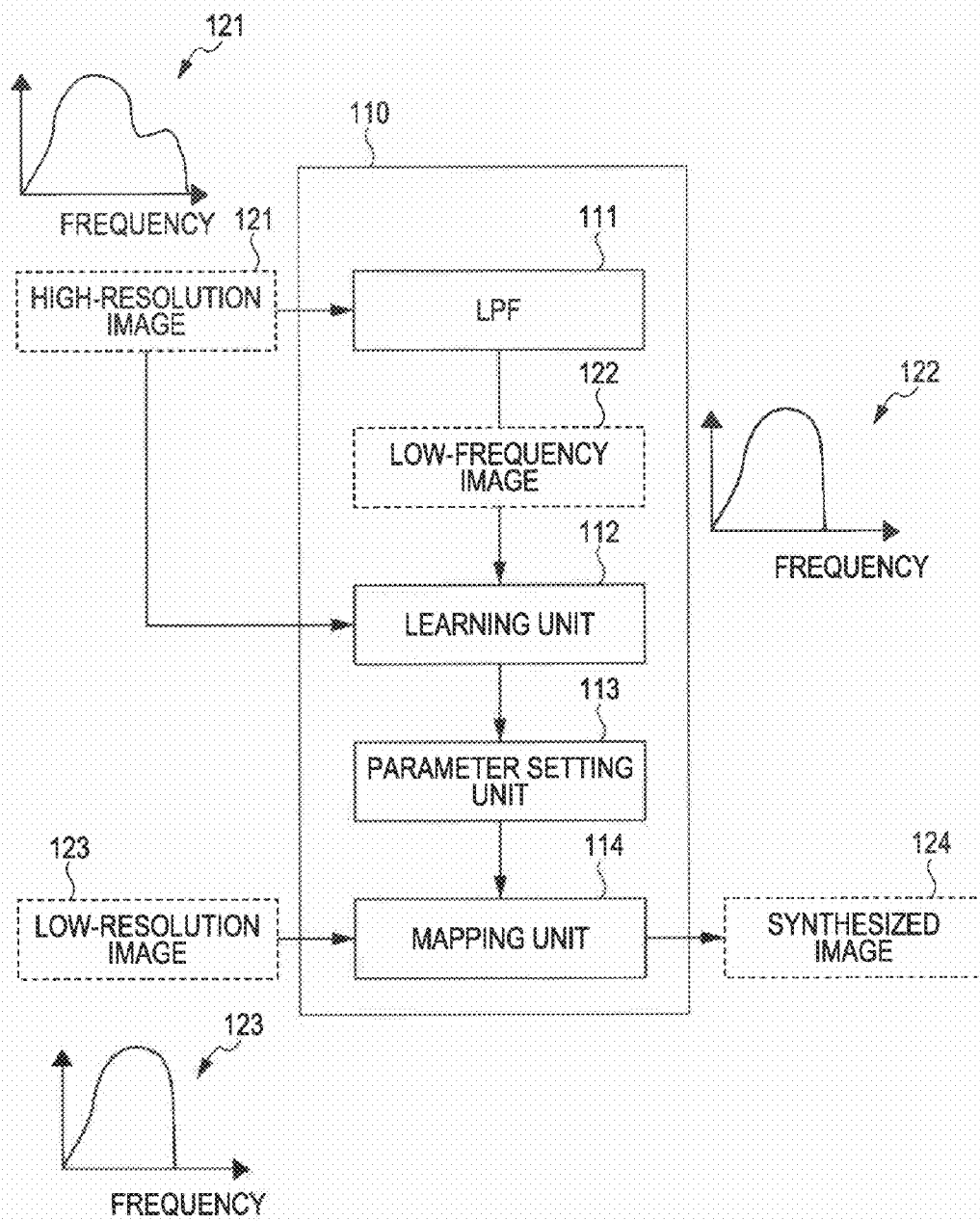

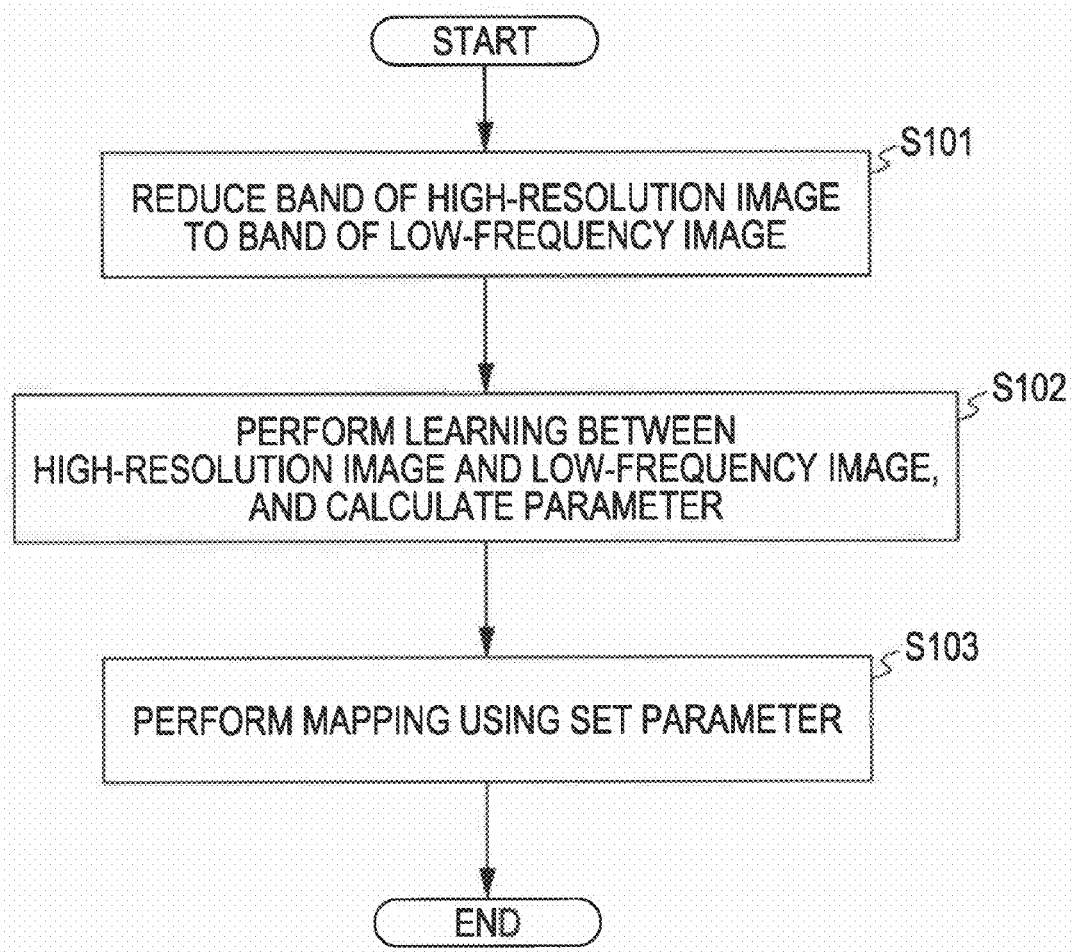

SIGNAL PROCESSING APPARATUS, SIGNAL PROCESSING METHOD, PROGRAM AND RECORDING MEDIUM

BACKGROUND OF THE INVENTION

1. Field of the Invention

The invention relates to a signal processing apparatus, signal processing method, program and recording medium that are suitably applied, for example, a high-contrast ratio image in a wide range is obtained.

2. Description of the Related Art

In an existing art, in order to capture a landscape, or the like, in a wide angle of view, for example, a panoramic imaging method, an multi-camera imaging method in which a plurality of cameras are placed at a plurality of locations, an imaging method in which a low-resolution dynamic image is synthesized with a high-resolution static image, a multi-focus imaging method that uses a camera having a plurality of foci, and the like, are employed. Here, the "angle of view" means a range in which a subject can be captured through a lens of a camera. Hereinafter, the above imaging methods will be simply described.

In the panoramic imaging method, images captured by a plurality of cameras are pieced together to generate a wide-area image. The panoramic imaging method includes a single eyepoint method and a multiple eyepoint method. In the single eyepoint method, because a plurality of cameras capture a subject at one and the same location, a pieced image has no boundary. In the multiple eyepoint method, because a plurality of cameras capture a subject at different locations, a pieced image has a boundary.

In the case of the single eyepoint method, the peripheral portions of images before piecing deform because of the characteristics, or the like, of the lenses assembled to the cameras. Deformation of images causes degradation of a pieced image. If a deformed image is directly projected onto a screen, deformation in the image at the edge of the screen becomes further conspicuous.

In the case of the single eyepoint method, a common portion at which adjacent images overlap occurs around a boundary of images captured by the adjacent cameras. Here, the common portion of the adjacent images will be described with reference to FIG. 33.

FIG. 33 is an example of an imaging method using cameras that are arranged so that imaging directions of the cameras meet at one point. In this method, three cameras $101a$ to $101c$ are arranged on extended lines in the imaging directions with respect to an eyepoint $102$ as a reference. Note that the imaging directions respectively coincide with the optical axes of the cameras. Then, a point at which the plurality of optical axes meet one another is used as a virtual "eyepoint of a camera array (a plurality of cameras)". When images captured by the plurality of cameras are synthesized, it may be necessary to consider the above described two types of eyepoints, that is, the "eyepoint of the camera array" and the "eyepoints of the cameras". Here, the method for coinciding the "eyepoints of the cameras" with one another has two types, and these methods are called "single eyepoint method". The first method images a subject using a relay optical system with a physically one lens. The second method images a subject so that cameras are respectively set to angles of view without any common portion at which adjacent images overlap. Even when the "eyepoints of the cameras" are intended to coincide with one another using a method other than the single eyepoint method, it is difficult because the size of the lens differs among the cameras.

Referring back to FIG. 33, the cameras $101a$ to $101c$ each capture a subject located in a long-distance view $103$ and a short-distance view $105$ at the same angle of view. Then, the cameras $101a$ to $101c$ focus on an object focal plane $104$. At this time, there is a common portion $103a$ at which imaging portions of the adjacent cameras $101a$ and $101b$ overlap in the long-distance view $103$. Similarly, there is a common portion $103b$ at which imaging portions of the adjacent cameras $101b$ and $101c$ overlap is present in the long-distance view $103$. In addition, there is a common portion $104a$ at which imaging portions of the adjacent cameras $101a$ and $101b$ overlap in the object focal plane $104$. Similarly, there is a common portion $104b$ at which imaging portions of the adjacent cameras $101b$ and $101c$ overlap in the object focal plane $104$.

The common portions $103a$, $103b$, $104a$ and $104b$ of the images captured by the cameras $101a$ to $101c$ are mixed in chromaticness pixel by pixel. However, when the eyepoints of the plurality of cameras do not coincide with one another, an object distance from each camera to a subject varies. A plurality of images captured on a specific focal plane (in this example, the plane of the object focal plane $104$) may be pieced smoothly, whereas, when an object distance from each camera to a subject varies (in this example, a state where the long-distance view $103$ and the short-distance view $105$ are mixed), a joint between the images tends to appear to be unnatural (also referred to as "short-distance view split"). Thus, even when the common portions of the plurality of images are mixed with each other, it is difficult to maintain the images at high resolution.

Here, the technique for synthesizing images will be simply described by referring to Japanese Unexamined Patent Application Publication (Translation of PCT Application) No. 2005-522108 to Japanese Unexamined Patent Application No. 2004-135209. Japanese Unexamined Patent Application Publication (Translation of PCT Application) No. 2005-522108 describes the short-distance view split. There is described a technique that an upgrading function that is learned in high-grade representation and low-grade representation is used to improve the grades of image data, video data and audio data.

On the other hand, in the multiple eyepoint method, cameras that can obtain images of the same resolution and chromaticness are arranged at a plurality of locations to capture a subject. An individual difference of each camera appears in a difference in zoom rate, or the like, so the influence of the individual difference is excluded to equalize the performances of the cameras. At this time, in order to capture a subject using cameras of which the characteristics are virtually equalized, an image obtained by each camera is calibrated by various methods.

Japanese Unexamined Patent Application Publication No. 7-143439 describes an image capturing apparatus. The image capturing apparatus integrates a dynamic image capturing unit that captures a dynamic image at a low resolution and a static image capturing unit that captures a static image at a high resolution, and obtains a high-quality image at a desired photo opportunity.

Japanese Unexamined Patent Application Publication No. 2005-318548 describes a technique for imaging so that a first image data sequence (image data sequence of low resolution and high frame rate) and a second image data sequence (image data sequence of high resolution and low frame rate) fall within the same range. When these two image data sequences are integrated to execute image processing, a high-resolution and high-frame rate image may be obtained.

The methods described in Japanese Unexamined Patent Application Publication No. 7-143439 and Japanese Unexamined patent Application Publication No. 2005-318548 assign time and resolution for each camera. For example, when one camera captures a narrow range for a long period of time, an obtained image has a high resolution. On the other hand, when another camera captures a wide range for a short period of time, an obtained image has a low resolution. In this way, there is a trade-off relationship between capturing time and resolution. Then, cameras are placed at the same location (location of eyepoint), the camera that capture a narrow range and the camera that captures a wide range are separated, and then the captured images are synthesized. As a result, an image captured at a high resolution in a wide range may be obtained, so the trade-off relationship between time and resolution is eliminated.

When a plurality of images are synthesized, a following signal processing apparatus 110 is used. FIG. 34 shows an example of the configuration of the existing signal processing apparatus 110. The signal processing apparatus 110 includes a low-frequency extracting unit (LPF: Low Pass Filter) 111. The low-frequency extracting unit 111 inputs a high-resolution image 121, generated by a first camera that captures a subject at a narrow angle of view, and extracts a low-frequency image 122 of which the frequency is lower than a predetermined frequency band. In FIG. 34, together with processing blocks, histograms in which the abscissa axis represents a frequency and the ordinate axis represents a gain of a frequency are shown in regard to the high-resolution image 121 and the low-frequency image 122.

In addition, the signal processing apparatus 110 includes a learning unit 112 and a parameter setting unit 113. The learning unit 112 learns a correspondence relationship of the high-resolution image 121 with respect to the low-frequency image 122 on the basis of the input high-resolution image 121 and low-frequency image 122. The parameter setting unit 113 sets various parameters. Then, the signal processing apparatus 110 includes a mapping unit 114. The mapping unit 114 superimposes the high-resolution image 121, supplied from the parameter setting unit 113, on a low-resolution image 123 captured at a wide angle of view by a second camera (not shown) to generate a synthesized image 124. The mapping unit 114 outputs the synthesized image 124 to an external output device.

FIG. 35 shows an example of existing image processing executed by the signal processing apparatus 110. First, a low-frequency extracting unit 111 reduces the band of the high-resolution image 121, captured at a narrow angle of view, to the low frequency of the low-resolution image 123 captured at a wide angle of view, and extracts the low-frequency image 122 (step S101). Subsequently, the learning unit 112 performs learning between the high-resolution image 121 and the low-frequency image 122 extracted by the low-frequency extracting unit 111, and the parameter setting unit 113 obtains parameters (step S102).

The mapping unit 114 uses the parameters set by the parameter setting unit 113, and performs mapping in which the high-resolution image 121 is superimposed at a position corresponding to the low-resolution image 123 in a wide angle of view (step S103). An image that is obtained by mapping the high-resolution image 121 on the low-resolution image 123 is output as a synthesized image.

Japanese Unexamined Patent Application Publication No. 9-139878 describes a technique for imaging with multiple foci. The above technique is intended to obtain an image of which the correct focus is achieved for any one of a long-distance view and a short-distance view. Then, the lenses of a plurality of cameras each include an outer lens that brings the long-distance view into focus and a center lens that brings the short-distance view into focus.

Japanese Unexamined Patent Application Publication No. 2004-135209 describes a technique for, when a plurality of cameras are arranged, synthesizing high-resolution images after positions of the eyepoints of the cameras are corrected.

SUMMARY OF THE INVENTION

Incidentally, in the technique described in Japanese Unexamined Patent Application Publication (Translation of PCT Application) No. 2005-522108, the width of the common portion at which adjacent images overlap is made variable to handle a short-distance view split. However, when a plurality of objects are present within a capturing range of the cameras or when a plurality of cameras are arranged one above the other or side by side, it is difficult to piece the images smoothly.

For example, as in the case of DRC (Digital Reality Creation: trademark), there is a process of converting even a low-resolution image, subjected to various processings and degraded, into a high-resolution image. However, even with the DRC, the band of an obtained high-resolution image is limited, so, for example, defects are conspicuous in each pixel when the image is enlarged.

In addition, the techniques described in Japanese Unexamined Patent Application Publication No. 7-143439 and Japanese Unexamined Patent Application Publication No. 2005-318548 are processes based on the structure of an I-picture and a P-picture used for MPEG (Moving Picture Experts Group). The I-picture is a high-resolution image, and the P-picture includes information related to motion of a subject. In this technique, because assignment of a camera that captures a high-resolution image and a camera that calculates motion information is fixed, it is not easy to increase resolution. For this reason, it is difficult to increase the resolution of an image with respect to the resolution of a solid-state image sensing device (for example, CMOS: Complementary Metal Oxide Semiconductor, CCD: Charge Coupled Device) provided for the camera that captures a static image.

In addition, in the technique described in Japanese Unexamined Patent Application Publication No. 9-139878, the respective lenses take charge of the foci of the long-distance view and the short-distance view to perform imaging; however, there is no focus common to a large number of cameras. Thus, each camera easily becomes out-of-focus, so a pieced image tends to appear to be unnatural.

In addition, in the technique described in Japanese Unexamined Patent Application Publication No. 2004-135209, for example, when a subject in which a dark room and a bright outdoor appear at the same time is captured, the captured image has a high contrast ratio. When the high-contrast ratio subject is captured, the texture (feel of material of the surface of an object) of the room or outdoor disappears or it exceeds an imageable luminance. Thus, an image in the dark room is blurred in white or a landscape of the bright outdoor disappears.

It is desirable to obtain a high-contrast ratio image when a high-contrast ratio subject in a wide range is captured.

According to an embodiment of the invention, a first image generated by a first camera that captures a subject included in a predetermined range at a first angle of view is received, and a plurality of second images that are higher in resolution than the first image and generated by a plurality of second cameras, each of which captures part of the subject included in the predetermined range at a second angle of view that is narrower than the first angle of view, are received. Subsequently, a similar portion between part of the subject included in the first image and a subject included in each of the second images is detected, and the second images are pasted at positions corresponding to the detected similar portions within the first image to generate a synthesized image. In addition, an area, for which image information is insufficient in the first image and is difficult to complement by the second cameras, is detected as a non-imageable area from the synthesized image. Then, a camera parameter for controlling the second camera that captures the second image by which the image information insufficient in the first image is complemented is changed.

With the above configuration, a high-resolution synthesized image with a high contrast ratio may be obtained.

According to the embodiment of the invention, because a high-resolution synthesized image with a high contrast ratio may be obtained, it is advantageously possible to display a synthesized image on a large screen with an increased contrast ratio.

BRIEF DESCRIPTION OF THE DRAWINGS

FIG. 4 is a view that illustrates an example of a variation in zoom rate in the embodiment of the invention;

FIG. 5A and FIG. 5B are views that illustrate an example of common information and individual information in the embodiment of the invention;

FIG. 6 is a flowchart that shows an example of a process of changing camera parameters of second cameras in the embodiment of the invention;

FIG. 7 is a view that illustrates an example of a high-contrast ratio subject in the embodiment of the invention;

FIG. 11 is a view that illustrates an example of a luminance histogram that shows an imageable luminance range of a second camera in the embodiment of the invention;

FIG. 12 is a view that illustrates an example of a luminance histogram that shows an imageable luminance range of a second camera in the embodiment of the invention;

FIG. 13 is a view that illustrates an example of a luminance histogram that shows an imageable luminance range of a first camera in the embodiment of the invention;

FIG. 34 is a block diagram that shows an example of the configuration of an existing signal processing apparatus; and FIG. 35 is a flowchart that shows an example of existing image processing.

DESCRIPTION OF THE PREFERRED EMBODIMENTS

Hereinafter, an embodiment of the invention will be described with reference to FIG. 1 to FIG. 28. In the present embodiment, an example in which a signal processing apparatus 10 according to the embodiment of the invention is applied to an image processing system 1 to capture a high-contrast ratio subject in a wide range and then generate a high-resolution and high-contrast ratio synthesized image will be described.

Example of Configuration of Image Processing System 1

Figure 1:
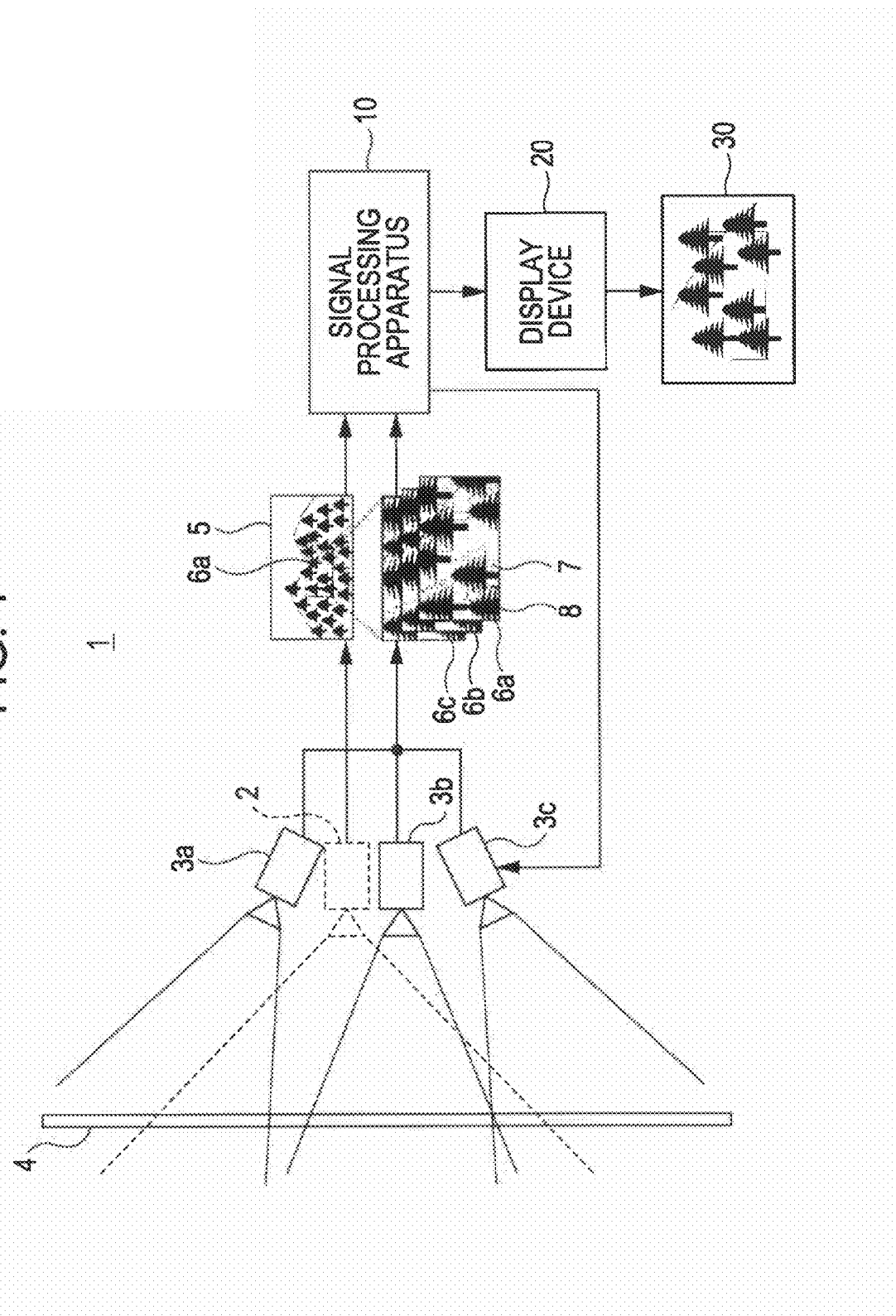
FIG. 1 is a configuration view that shows an example of an image processing system according to an embodiment of the invention.

FIG. 1 shows an example of the configuration of the image processing system 1. The image processing system 1 includes a first camera 2 and second cameras 3a to 3c. The first camera 2 captures a predetermined range at a first angle of view to generate a first image 5. The second cameras 3a to 3c capture portions of the predetermined range at second angles of view narrower than the first angle of view, and generate second images 6a to 6c. The first image 5 and the second images 6a to 6c are supplied to the signal processing apparatus 10 that synthesizes a plurality of images to generate a high-resolution image with a wide range. The synthesized image generated by the signal processing apparatus 10 is output to a display device 20 formed of, for example, a projector. The display device 20 projects the input synthesized image 30 onto a screen.

High-resolution cameras, HD (High Definition) cameras, or the like, are used as the first camera 2 and the second cameras 3a to 3c. These cameras each have an individual difference, and it is expensive when a calibration is performed to adjust the individual difference. However, in the present embodiment, the second cameras 3a to 3c are calibrated on the basis of "common information" with respect to the eyepoint, chromaticness, luminance and focus of the first camera 2 as a reference. Thus, the individual difference of each camera is easily adjusted at low cost. The individual differences of the second cameras 3a to 3c are managed as "individual information" separately. In addition, the signal processing apparatus 10 according to the present embodiment is, for example, able to generate an image having 10-bit grayscale using the first camera 2 and the second cameras 3a to 3c that are able to perform capturing in 8-bit grayscale depending on a luminance distribution of each area captured by each camera.

The image processing system 1 according to the present embodiment changes a manner of capturing of each of the first camera 2 and the second cameras 3a to 3c depending on an image captured. For example, the signal processing apparatus 10 changes camera parameters on the basis of luminance distributions and color distributions of the first image 5 and second images 6a to 6c. In addition, the signal processing apparatus 10 changes the camera parameters on the basis of the frequencies of the first image 5 and second images 6a to 6c (fineness of the waveform of each image).

Example of Internal Configuration of Signal Processing Apparatus 10

Figure 2:
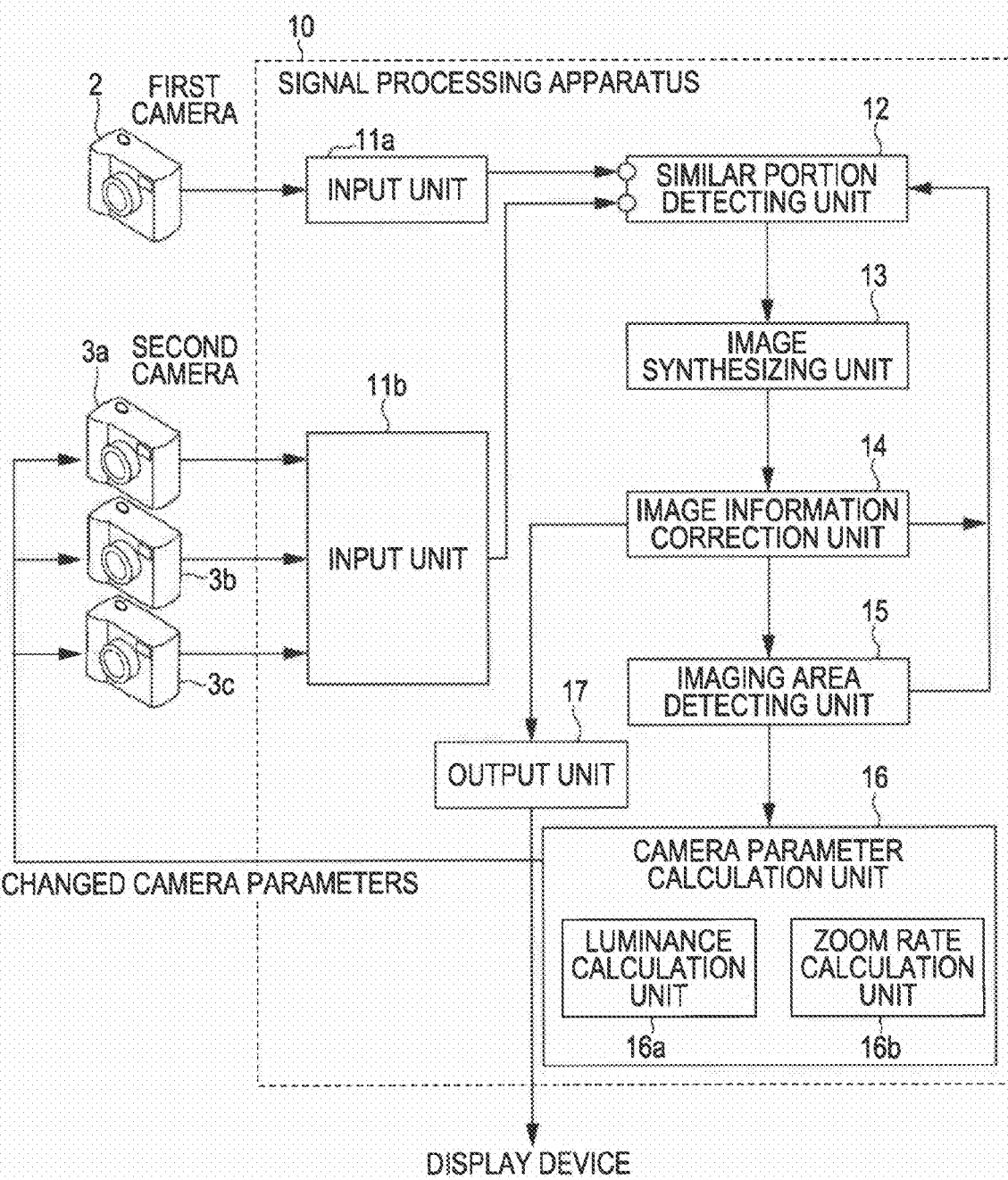
FIG. 2 is a block diagram that shows an example of the internal configuration of a signal processing apparatus according to the embodiment of the invention.

FIG. 2 shows an example of the internal configuration of the signal processing apparatus 10. The signal processing apparatus 10 includes an input unit 11a and an input unit 11b. The first image 5 captured by the first camera 2 is input to the input unit 11a. The second images 6a to 6c are input from the second cameras 3a to 3c to the input unit 11b. In addition, the signal processing apparatus 10 includes a similar portion detecting unit 12. The similar portion detecting unit 12 detects portions similar between a subject included in the first image 5 acquired through the input unit 11a and subjects included in the second images 6a to 6c acquired through the input unit 11b as "similar portions". The "similar portions", for example, indicate portions at which trees, which are part of woods included in the first image 5, are similar to trees respectively included in the second images 6a to 6c. By detecting the similar portions, the positions of the second images 6a to 6c with respect to the first image 5 turn out, and it is possible to easily match portions of the first image 5 with the second images 6a to 6c.

In addition, the signal processing apparatus 10 includes an image synthesizing unit 13. The image synthesizing unit 13 converts the phases, or the like, of the second images 6a to 6c on the basis of the similar portions detected by the similar portion detecting unit 12, and pastes the second images 6a to 6c at positions corresponding to the detected similar portions within the first image 5. In addition, the signal processing apparatus 10 includes an image information correction unit 14. The image information correction unit 14 corrects image information included in the synthesized image on the basis of pieces of image information included in the first image 5 and the second images 6a to 6c. In this embodiment, the "image information" includes information of at least any one of luminance, chromaticity and frequency. Thus, the image information correction unit 14 corrects the synthesized image on at least any one of luminance, chromaticity and frequency. The information of luminance and chromaticity converted by the image information correction unit 14 is supplied to the similar portion detecting unit 12. In addition, an image of which the luminance and chromaticity are converted by the image information correction unit 14 is output to the display device 20 via the output unit 17.

In addition, the signal processing apparatus 10 includes an imaging area detecting unit 15. The imaging area detecting unit 15 detects an area, for which image information is insufficient in the first image 5 and is difficult to complement by the second cameras 3a to 3c, as a non-imageable area from the synthesized image. The imaging area detecting unit 15 according to the present embodiment obtains imageable areas that the cameras are able to image and non-imageable areas that it is difficult for the cameras to image on the basis of the first image 5 and the second images 6a to 6c. Then, luminances and frequencies included in subjects are used as reference information for obtaining the imageable areas and the non-imageable areas. The image information corrected by the image information correction unit 14 and the information about imaging areas, detected by the imaging area detecting unit 15, are supplied to the similar portion detecting unit 12, and are used when similar portions are detected.

In addition, the signal processing apparatus 10 includes a camera parameter calculation unit 16. The camera parameter calculation unit 16 changes camera parameters for controlling the second cameras 3a to 3c that capture the second images 6a to 6c that complement image information insufficient in the first image 5 on the basis of the imaging areas detected by the imaging area detecting unit 15. Each camera parameter includes information, such as eyepoint position, exposure, focus, and the like.

The camera parameter calculation unit 16 includes a luminance calculation unit 16a. The luminance calculation unit 16a obtains a luminance distribution of a subject included in each of the first image 5 and the second images 6a to 6c, detects an imageable luminance area of each of the first camera 2 and the second cameras 3a to 3c, and then makes each camera parameter include information that changes a zoom rate. In addition, the camera parameter calculation unit 16 includes a zoom rate calculation unit 16b. The zoom rate calculation unit 16b obtains a frequency distribution of a subject, detects a non-imageable area on the basis of the imageable areas of the first and second cameras, and then makes each camera parameter include a zoom rate. The second cameras 3a to 3c change the camera parameters on the basis of the camera parameters calculated by the camera parameter calculation unit 16.

Figure 3:
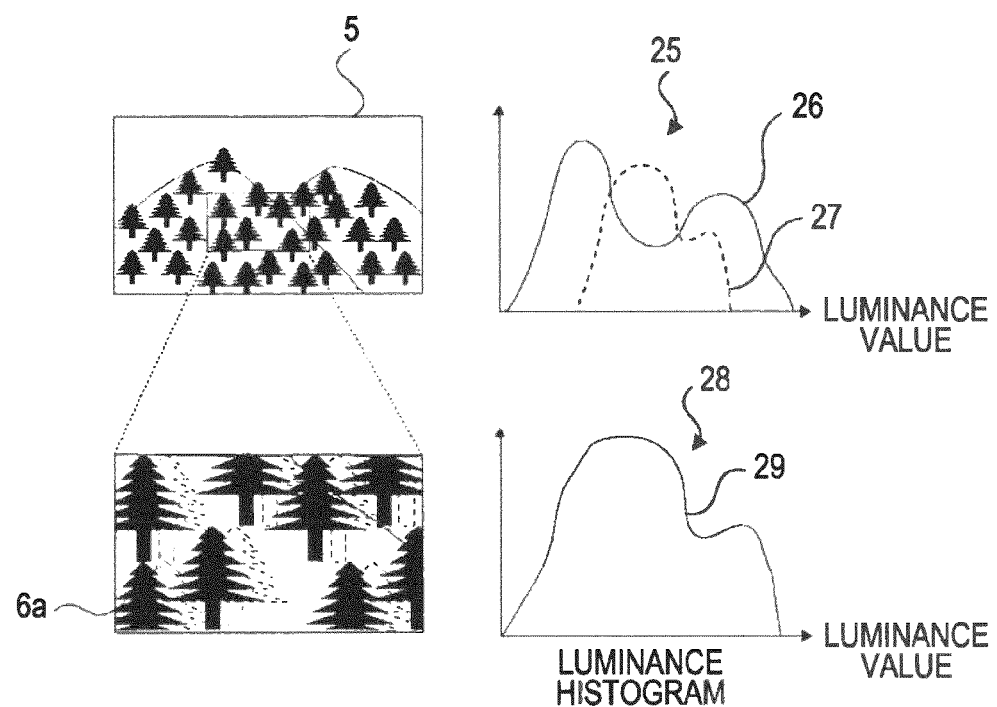
FIG. 3 is a view that illustrates an example of a luminance distribution of each image in the embodiment of the invention.

FIG. 3 shows an example of a luminance distribution using luminance histograms of the first image 5 and the second image 6a. The luminance of the first image 5 is shown as a luminance histogram 25. The luminance histogram 25 shows a luminance distribution 26 over the entire first image 5 and a luminance distribution 27 of a range in which the second image 6a is captured. The luminance of the overall second image 6a is shown as a luminance histogram 28. The luminance distributions 27 and 29 have different scales but represent the same luminance distribution.

As shown in the luminance histogram 25, only with the first camera 2, if a subject has a high luminance or a subject has a wide dynamic range, a non-imageable portion due to insufficient grayscale may possibly occur. In the example shown in FIG. 3, around the middle luminance value of the luminance distribution 26, a luminance is insufficient as compared with the luminance distribution 29. For this reason, when the images 6a to 6c captured by the second cameras 3a to 3c are superimposed on the first image 5, it is possible to reproduce a luminance of the original subject. Then, because detailed luminance information may be obtained, an image may be displayed on the display device 20 in larger bits as compared with the first image 5, or an image may be adjusted.

FIG. 4 is an example of angles of view due to a variation in zoom rate. In FIG. 4, arrangement of the first camera 2 and the second cameras 3a to 3c is similar to that of FIG. 1. For example, when a subject is viewed in detail, the second camera 3b zooms in and the other second cameras 3a and 3c zoom out. Then, when a moving object is found within a range that is captured by the first camera 2 in a wide range, the second camera 3b zooms in to make it possible to capture the object. Thus, it may be necessary to allow the zoom rate to be changed camera by camera.

In addition, a low-resolution image may be partially obtained from an image of a wide range captured by the first camera 2. Thus, when the imaging ranges of the second cameras 3a to 3c are not continuous, the first image 5 captured by the first camera 2 is put in a gap between the adjacent imaging ranges to make it possible to generate a synthesized image. In addition, it is also conceivable that a high-frequency component is detected by, for example, a high-pass filter for an image as a trigger for changing the zoom rate of each camera and then high-frequency portions are mainly captured.

In the present embodiment, because the first image 5 captured by the first camera 2 is used as a reference when images are synthesized, the zoom rate of the first camera 2 is not changed. Thus, the angle of view of the first camera 2 is not changed. On the other hand, the angles of view of the second cameras 3a to 3c when the respective zoom rates are changed are narrower than the angles of view of the original zoom rates. Thus, an area 21 after the zoom rate is changed is narrower than an imageable area 22 at the original zoom rate; however, a further higher-resolution image may be obtained.

Then, the camera parameter calculation unit 16 obtains information related to at least any one of color, luminance and focus as a camera parameter by which the characteristic amounts of the second images 6a to 6c are determined pixel by pixel. In this way, by changing the characteristics of the second cameras 3a to 3c using the camera parameters, insufficient pieces of information in the images captured by the respective cameras may be complemented. Information complemented at this time is termed "camera parameter". The camera parameter includes resolution, luminance, focus, white balance, eyepoint, or the like. Hereinafter, the camera parameter will be described.

(1) In the Case of Resolution

The second cameras 3a to 3c each change the zoom rate to be able to perform capturing by freely changing the resolution for each imaging area.

(2) In the Case of Eyepoint

The second cameras 3a to 3c each are able to perform capturing by freely changing the eyepoint in accordance with a target subject.

(3) In the Case of White Balance (Chromaticness)

The second cameras 3a to 3c each are able to perform capturing by freely changing the white balance for each imaging area in accordance with the color of a subject.

(4) In the Case of Luminance

The second cameras 3a to 3c each are able to perform capturing by freely changing the luminance for each imaging area using auto gain, or the like.

(5) In the Case of Focus

The second cameras 3a to 3c each are able to perform capturing by freely changing the focus for each imaging area in accordance with a distance to a subject.

The second cameras 3a to 3c each change the resolution and the luminance for each imaging area depending on a zoom rate. Then, the focus is changed for each imaging area in accordance with a distance to a subject, and the white balance is changed for each imaging area in accordance with the color of an image captured, thus changing the eyepoint to the subject.

FIG. 5A and FIG. 5B show an example of common information and individual information. In the present embodiment, information related to the camera parameter of the first camera 2 is termed "common information". The common information is used as a reference over the first camera 2 and the second cameras 3a to 3c overall, and mainly indicates differences of the second cameras 3a to 3c with respect to the first camera 2. When the common information is used, it is possible to remove the influence of the individual difference, parallax, and the like, of each camera when a plurality of images captured by the cameras are pieced. However, the common information may be obtained by capturing a wide range, so the resolution is extremely low.

On the other hand, information related to the camera parameters of the second cameras 3a to 3c with respect to the common information is termed "individual information". The individual information differs from the common information of the camera array overall but the quality of information (resolving power of resolution, resolving power of luminance, resolving power of chromaticness, location at which a focus is adjusted, or the like) is high. The common information has a high quality of information, such as resolution, in contrast to the individual information, but an individual difference among the cameras is not considered. It is difficult to manage the common information and the individual information only by one camera, and are managed by the camera parameter calculation unit 16. By obtaining a difference of the individual information with respect to the common information, a variation in camera parameter of each of the second cameras 3a to 3c with respect to the first camera 2 turns out. Then, the turned-out variation in camera parameter is used to, for example, correct a deviation and/or chromaticness of an image when the image synthesizing unit 13 synthesizes images.

FIG. 5A shows an example of how the common information and the individual information are managed. In the present embodiment, the second images 6a to 6c are superimposed using the eyepoint of the first camera 2 and the chromaticness of the first image 5 as a reference. Because the angle of view of the first camera 2 is wide, the first image 5 has a low resolution. On the other hand, the second cameras 3a to 3c each have a narrow angle of view, and zooms a portion of the first image 5 for capturing, so the second images 6a to 6c each have a high resolution. The eyepoint, chromaticness, luminance and focus of the first camera 2 are used as the common information that is used as a reference when the second images 6a to 6c are superimposed on the first image 5. In addition, the chromaticness, luminance and focus of the second cameras 3a to 3c differ in characteristic among cameras.

FIG. 5B shows an example of information generated using both the common information and the individual information. The individual information is related to resolution, eyepoint, chromaticness, luminance and focus that are used to match the characteristics of the second cameras 3a to 3c with the first camera 2. In the present embodiment, it is desirable to obtain an image of a high resolution equivalent to those of the second cameras 3a to 3c. In addition, when the location at which the first camera 2 is placed is set as one eyepoint, locations at which the second cameras 3a to 3c are placed are made to coincide with the eyepoint of the first camera 2. Then, in comparison with the low-resolution first image 5, the second images 6a to 6c each have detailed color information. In addition, in comparison with the first image 5 that only has low-luminance luminance information, the second images 6a to 6c each have high-luminance luminance information. In addition, the second cameras 3a to 3c each focus on a corresponding imaging area that includes a subject.

In the existing art, when a plurality of cameras that capture a subject at a narrow angle of view are arranged and then images are pieced together, because the eyepoints of the cameras are different, a joint between the images appears to be unnatural. In the present embodiment, the first camera 2 and the second cameras 3a to 3c are prepared, and the common information and individual information of a subject are captured separately. The common information and the individual information include information of resolution, eyepoint, chromaticness, luminance and focus. When the common information and the individual information are used, an image that utilizes the characteristic of each camera is obtained.

FIG. 6 is a flowchart that shows an example of a process of changing the camera parameters of the second cameras 3a to 3c. First, the signal processing apparatus 10 acquires the first image 5 from the first camera 2 via the input unit 11a, and acquires the second images 6a to 6c from the second cameras 3a to 3c via the input unit 11b (step S11).

Subsequently, the similar portion detecting unit 12 detects similar portions between the first image 5 and the second images 6a to 6c (step S12). At this time, the similar portion detecting unit 12 detects similar portions on the basis of the image information corrected by the image information correction unit 14 and the non-imageable area and imageable area detected by the imaging area detecting unit 15. In this embodiment, the similar portion detecting unit 12 detects the similar portion of each image and then detects the similar portion again to increase the accuracy of detecting a similar portion. Incidentally, each camera has an individual difference, so the detection accuracy is remarkably poor when the existing technique is used to detect a similar portion. Here, the "individual difference of the camera" means that the chromaticness, or the like, varies among the cameras because of a deviation in color filter, or the like.

To accurately obtain correction amounts of luminance, chromaticity, and the like, from the individual difference of each camera, it is desirable to match the phases of the images. Then, by performing feedback process, such as similar portion detection and individual difference correction, the accuracy of detecting a similar portion is improved. Here, the mathematical expression (1) by which a correction amount P for correcting the individual difference of each camera is shown below. A pixel value Y1 indicates a pixel value of each pixel of an image captured by the first camera 2. In addition, a pixel value Y2 indicates a pixel value of each pixel of an image captured by the second cameras 3a to 3c.

$$P = \frac{\sum |Y2 - AVG(Y2)|}{\sum |Y1 - AVG(Y1)|} \qquad (1)$$

As shown in the mathematical expression (1), the correction amount P is obtained by dividing the absolute value of a value obtained by subtracting an average pixel value from each pixel value of the second cameras 3a to 3c by the absolute value of a value obtained by subtracting an average pixel value from each pixel value of the first camera 2. Then, the following mathematical expression (2) is used to obtain a corrected pixel value Y2.

$$Y2 = P \times (Y1 - AVG(Y1)) + AVG(Y2) \qquad (2)$$

After the correction amount P is obtained, the individual differences of the second cameras 3a to 3c are corrected so that the pixel value Y1 of each pixel of the camera is matched with the pixel value Y2. Note that by using the result of the similar portion of each image, detected by the similar portion detecting unit 12, the correction amount P may be further obtained.

Then, the image synthesizing unit 13 pastes the second images 6a to 6c at predetermined positions so as to match with the phase of the first image 5 (step S13). The image conversion and pasting in step S13 employ the technique described in Japanese Unexamined Patent Application Publication No. 2004-135209.

Then, the image information correction unit 14 converts the luminances of the second cameras 3a to 3c so as to match with the luminance of the first camera 2 (step S14). Then, the image information correction unit 14 transfers the images to the similar portion detecting unit 12 again so as to match the luminance and the chromaticity (step S15).

After the process in step S14, the imaging area detecting unit 15 detects information related to the non-imageable area that is not imageable by both the first camera 2 and the second cameras 3a to 3c (step S16). The imaging area detecting unit 15 obtains a luminance distribution of a subject on the basis of a contrast ratio of part of a subject included in each of the first image 5 and the second images 6a to 6c. Then, the imaging area detecting unit 15 detects the non-imageable area on the basis of the luminance ranges in which it is difficult for the first camera 2 and the second cameras 3a to 3c to perform capturing. The non-imageable area includes a high luminance that may cause saturation of a subject. In addition, when a frequency distribution is obtained to detect the non-imageable area, the non-imageable area includes a region that has a high-frequency component that is difficult to be handled with the resolution of the camera at that time.

Then, the imaging area detecting unit 15 transmits information related to the imaging area detected for each camera to the similar portion detecting unit 12 (step S17). The information related to the imaging area is used as a parameter that indicates which area is matched by the similar portion detecting unit 12.

After the process of step S16, the camera parameter calculation unit 16 calculates camera parameters set for the second cameras 3a to 3c, and sets the camera parameters for the second cameras 3a to 3c (step S18).

Next, an example of a process of selecting a camera in the image processing system 1 according to the present embodiment will be described with reference to FIG. 7 to FIG. 17. In FIG. 7 to FIG. 17, a process of changing the imaging area of a camera on the basis of a luminance of a subject is performed. Hereinafter, the case in which the first camera 2 and the second cameras 3a and 3b are used to capture a subject will be described.

FIG. 7 shows an example of a high-contrast ratio subject 31. In this embodiment, the subject that is seen when capturing over a dark room to a bright outdoor will be described. The subject 31 includes a dark indoor area 32 and a bright outdoor area 33. The indoor area 32 includes, for example, window frames 32a to 32c. The outdoor area 33 includes, for example, the sun 33a, clouds 33b, and woods 33c.

In the existing art, when the camera focuses on the outdoor area 33, the patterns, and the like, of the window frames 32a to 32c included in the indoor area 32 appear to be dark. On the other hand, when the camera focuses on the indoor area 32, a subject included in the outdoor area 33 appears to be white, so, for example, leaves, and the like, of trees included in the woods 33c disappear. For this reason, it is difficult for a single camera to capture the subject 31 clearly.

Figure 8:
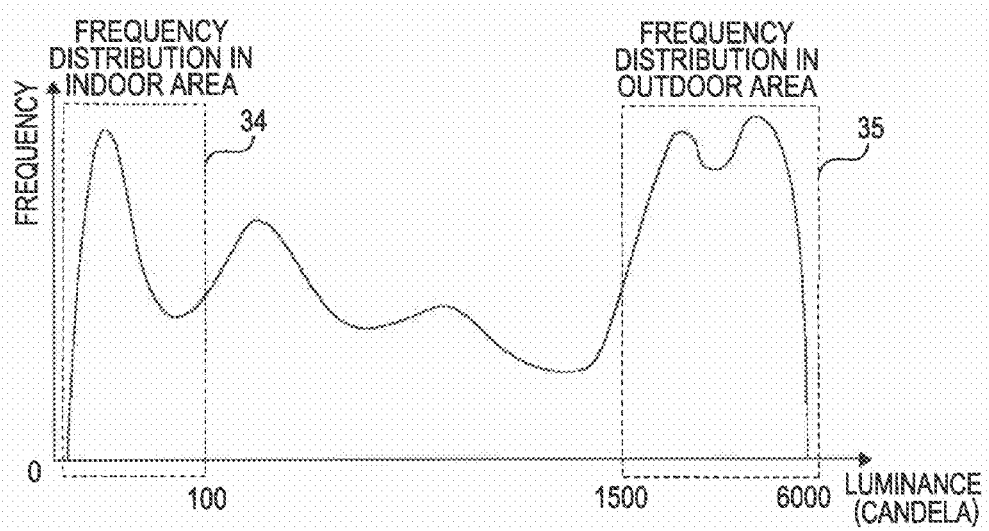
FIG. 8 is a view that illustrates an example of a luminance histogram in a real world in the embodiment of the invention.

FIG. 8 shows an example of a luminance histogram obtained from the subject 31. Luminance values of the luminance histogram are indicated in logarithmic display. Hereinafter, FIG. 8 to FIG. 12 each show a luminance histogram in which the abscissa axis represents a luminance and the ordinate axis represents a frequency. A luminance distribution 34 of the indoor area 32 is, for example, between 0 and 100 candela. Then, the luminance of the indoor area 32 reaches a peak within the luminance distribution 34. A luminance distribution 35 of the outdoor area 33 is, for example, between 1500 to 6000 candela. Then, the luminance of the outdoor area 33 reaches a peak within the luminance distribution 35.

Figure 9:
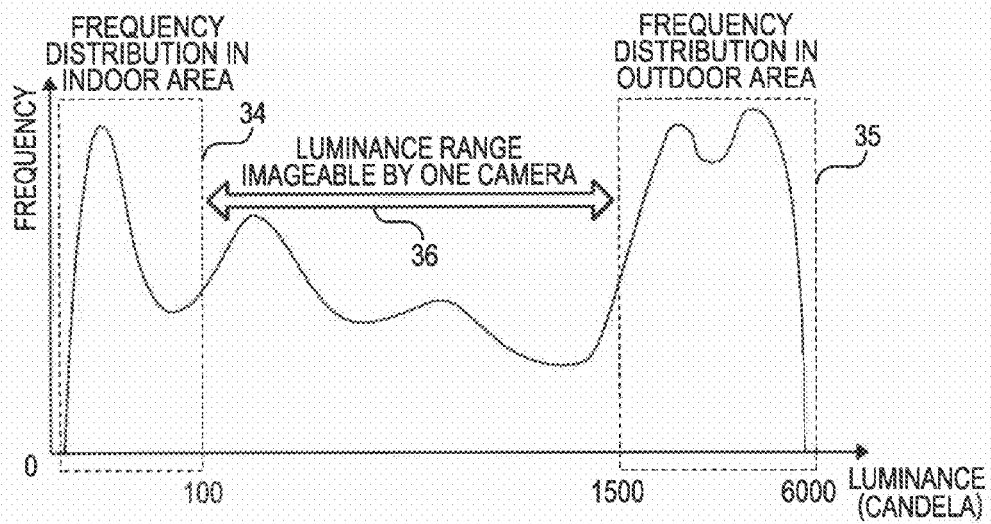
FIG. 9 is a view that illustrates an example of an imageable luminance range by one camera in the embodiment of the invention.

FIG. 9 shows an imageable luminance range 36 by a single camera within the luminance histogram shown in FIG. 8. The imageable luminance range 36 of the first camera 2 and second cameras 3a to 3c is limited within a certain range of 255 grayscales. For this reason, it is difficult to capture both the indoor area 32 and the outdoor area 33 at a time at a high luminance using only one of the first camera 2 and the second cameras 3a and 3b. In the present embodiment, the imaging areas of the cameras are differently set to the indoor area 32 and to the outdoor area 33, so the luminance of each obtained image is high. By synthesizing these images, a synthesized image having a high contrast ratio may be obtained.

Figure 10:
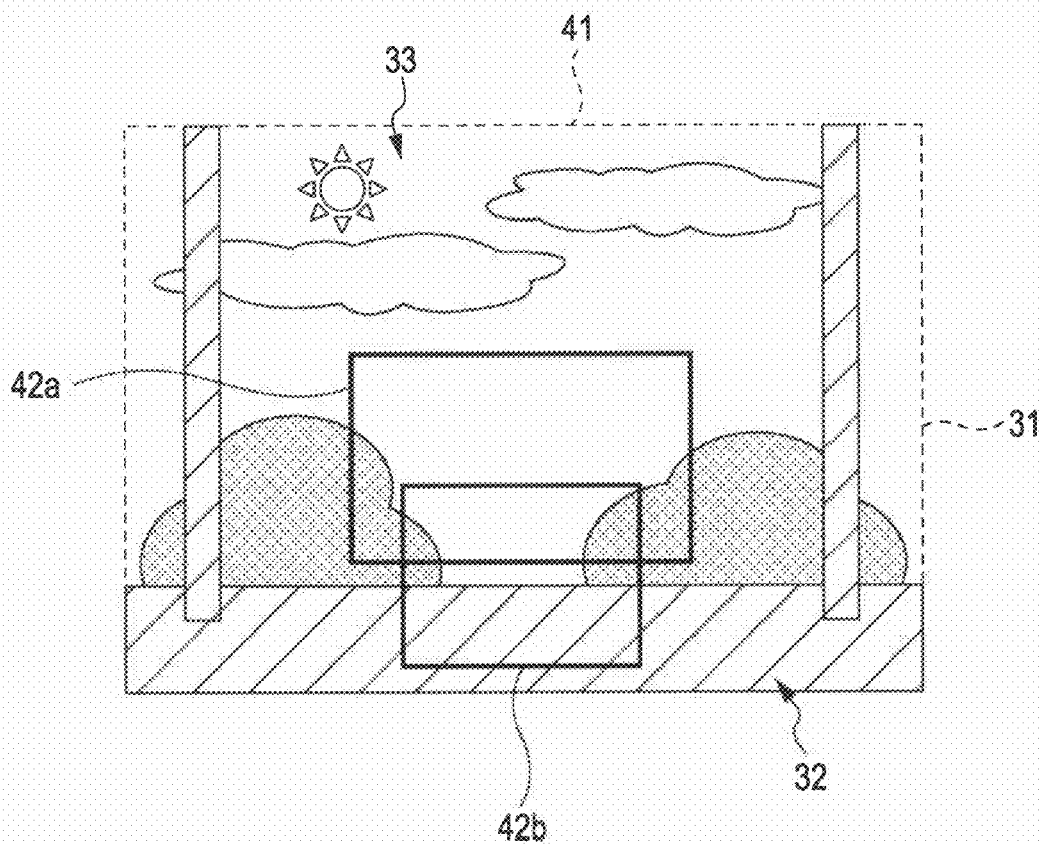
FIG. 10 is a view that illustrates an example of imaging areas of first and second cameras for a subject in the embodiment of the invention.

Here, a process of detecting an imaging area of each camera by the imaging area detecting unit 15 will be described with reference to FIG. 10 to FIG. 17. FIG. 10 shows examples of angles of view of the first camera 2 and second cameras 3a and 3b that capture the subject 31 shown in FIG. 7. The angles of view of the cameras shown in FIG. 10 are initial states before the angles of view are changed through camera parameters.

An angle of view 41 of the first camera 2 is set so as to capture the entire subject 31. In this embodiment, the angle of view 41 includes a subject in the indoor area 32 and a subject in the outdoor area 33. An angle of view 42a of the second camera 3a is set so as to capture the outdoor area 33. On the other hand, an angle of view 42b of the second camera 3b is set so as to capture the indoor area 32 and the outdoor area 33. However, the angle of view 42a of the second camera 3a partially overlaps the angle of view 42b of the second camera 3b. In addition, the angle of view 42b of the second camera 3b is smaller than the angle of view 42a of the second camera 3a.

FIG. 11 shows an example of a luminance histogram that shows an imageable luminance range of the second camera 3a. The second camera 3a is suitable for the case where a high-luminance (for example, between 500 to 6000 candela) subject is captured. Thus, when the second camera 3a captures a subject having a luminance that falls outside the range of 500 to 6000 candela, an obtained image becomes dark.

FIG. 12 shows an example of a luminance histogram that shows an imageable luminance range of the second camera 3b. The second camera 3b is suitable for the case where a low-luminance (for example, between 0 to 500 candela) subject is captured. Thus, when the second camera 3b captures a subject that has a luminance that falls outside the range of 0 to 500 candela, an obtained image becomes white.

FIG. 13 shows an example of a luminance histogram that shows an imageable luminance range of the first camera 2. The first camera 2 is suitable for the case where a subject of 100 to 1500 candela is captured. Thus, when the first camera 2 captures a subject that has a luminance that falls outside the range of 100 to 1500 candela, an obtained image becomes white.

The imaging area detecting unit 15 collects information related to an imageable luminance range of the host apparatus from the first camera 2 and the second cameras 3a and 3b. Then, an image captured at the angle of view 42a of the second camera 3a and an image captured at the angle of view 42b of the second camera 3b are mapped on an image captured at the angle of view 41 of the first camera.

Figure 14A:
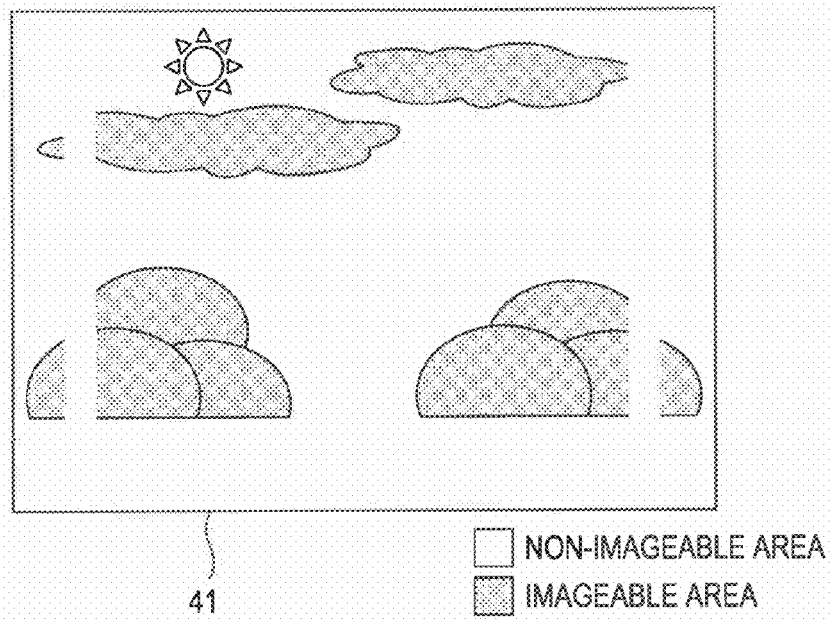
FIG. 14A to FIG. 14C are views that illustrate examples of angles of view, imageable areas and non-imageable areas of the first and second cameras in the embodiment of the invention.
Figure 14B:
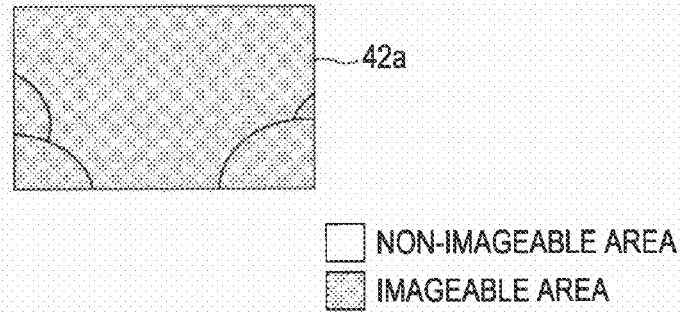
Figure 14C:
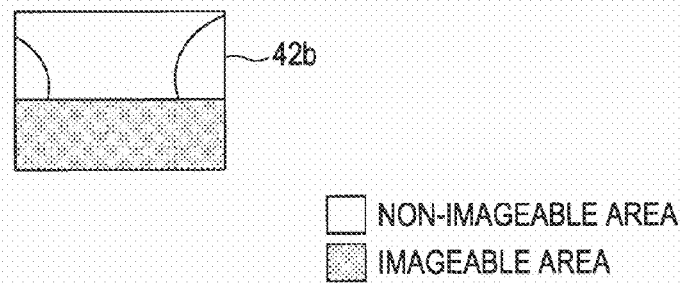

FIG. 14A to FIG. 14C show examples of angle of view of cameras and imageable and non-imageable areas. FIG. 14A shows an example of the angle of view 41 and imageable and non-imageable areas of the first camera 2. FIG. 14B shows an example of the angle of view 42a and imageable and non-imageable areas of the second camera 3a. FIG. 14C shows an example of the angle of view 42b and imageable and non-imageable areas of the second camera 3b.

The images included in the respective angles of view are equivalent to the images captured at the angles of view shown in FIG. 10. In the following description, blank portions are non-imageable areas that it is difficult for the cameras to capture, and shaded portions are imageable areas that the camera is able to capture.

Figure 15:
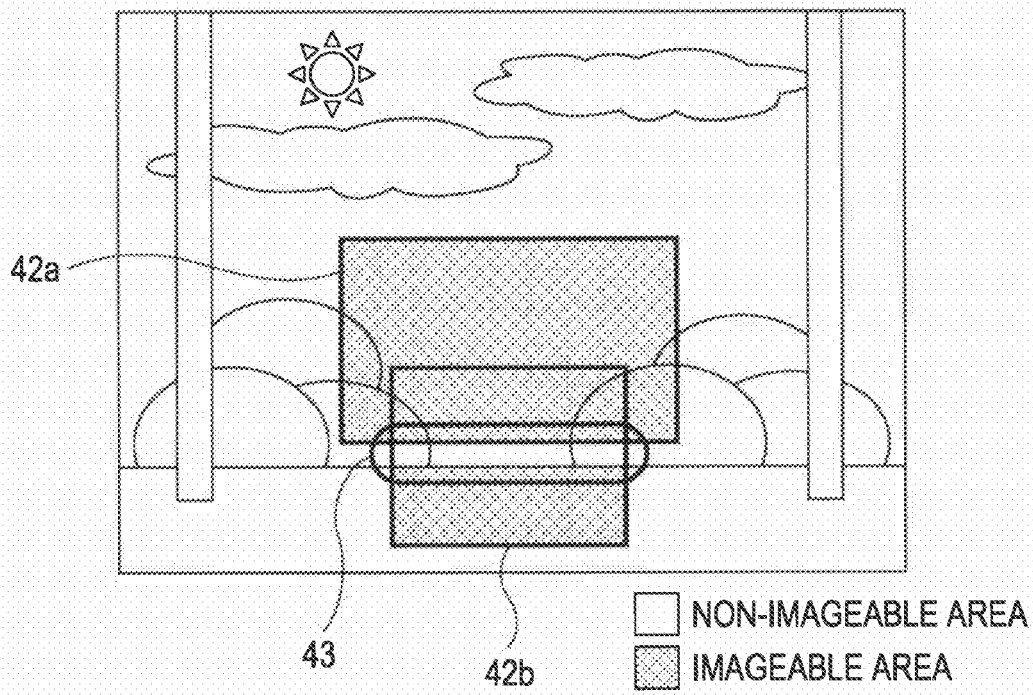
FIG. 15 is a view that shows an example of angles of view of a plurality of second cameras in the embodiment of the invention.

FIG. 15 shows an example of angles of view of the second cameras 3a and 3b. The angle of view 42a of the second camera 3a and the angle of view 42b of the second camera 3b are equivalent to the angles of view shown in FIG. 10.

The imaging area detecting unit 15 detects a portion at which the angle of view 42b of the second camera 3b does not overlap the angle of view 42a of the second camera 3a and which includes part of the outdoor area 33 as a non-imageable area 43 that it is difficult for any of the second cameras 3a and 3b to capture. Even when a plurality of images are synthesized in this state, it is difficult to obtain an image that clearly reproduces the luminance of the subject. Then, in order to distinguish the imageable area from the non-imageable area, the imaging area detecting unit 15 sets a flag for each pixel included in each image captured at the angles of view 42a and 42b.

Thus, the imaging area detecting unit 15 predicts a luminance of the non-imageable area 43, which may be necessary for capturing using the first camera 2. Then, a camera that is able to image the predicted luminance is selected from among the second cameras 3a and 3b. In this embodiment, it is assumed that the second camera 3a is selected. Then, the imaging area detecting unit 15 supplies the camera parameter calculation unit 16 with information for changing the angle of view. The camera parameter calculation unit 16 supplies the changed camera parameter to the second camera 3a so as to change the imaging range by expanding the angle of view of the second camera 3a, and performs setting for changing the angle of view of the second camera 3a. This camera parameter includes information for changing a zoom rate, and is able to change the angle of view of the camera by changing the zoom rate.

Figure 16:
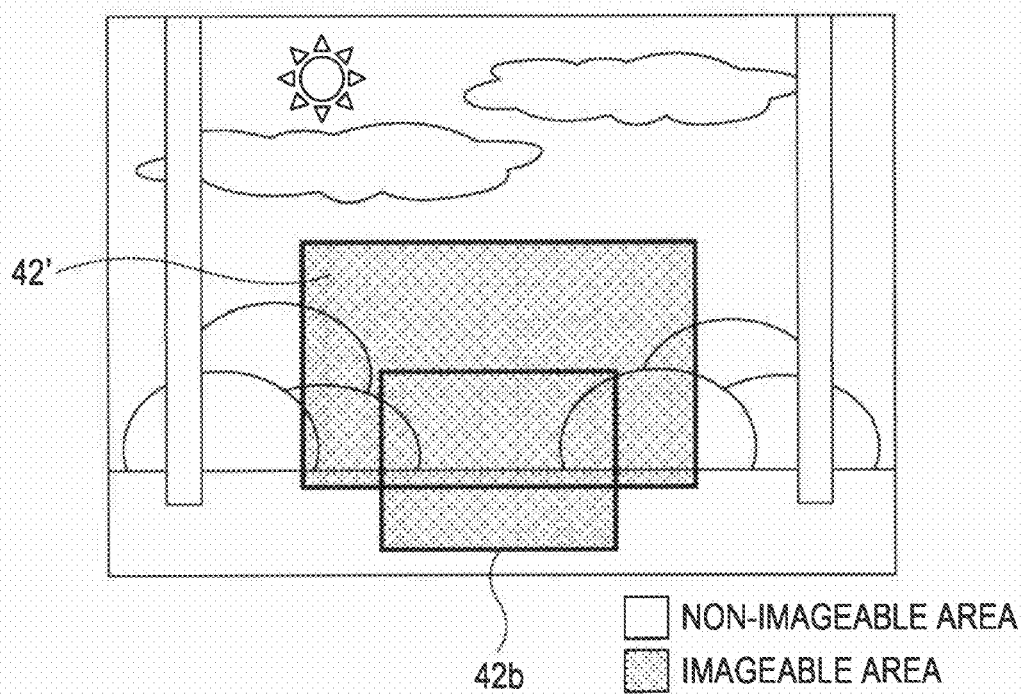
FIG. 16 is a view that shows an example of angles of view of a plurality of second cameras in the embodiment of the invention.

FIG. 16 shows an example of the angles of view of the second cameras 3a and 3b of which the angles of view are expanded. Here, an angle of view 42' that is obtained by expanding the angle of view 42a of the second camera 3a is shown. By expanding the angle of view 42a in this way, it becomes possible to capture the non-imageable area 43 (see FIG. 15) by the second camera 3a.

Figure 17:
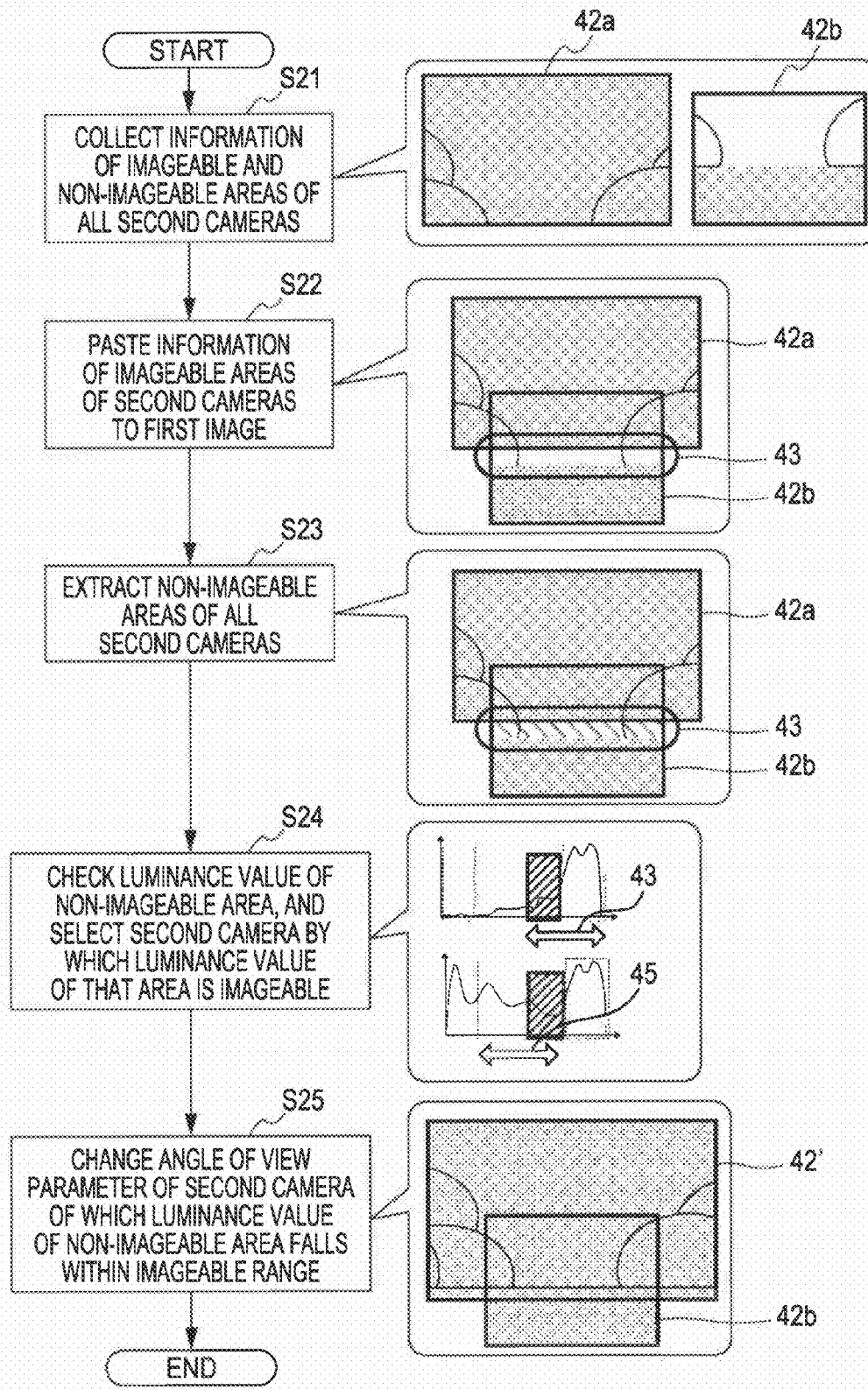
FIG. 17 is a flowchart that shows an example of a process of changing a camera parameter of a second camera in the embodiment of the invention.

FIG. 17 shows an example of a process of detecting an imaging area by the imaging area detecting unit 15. First, the imaging area detecting unit 15 obtains an imageable area of each camera on the basis of the angles of view 42a and 42b, at which the second cameras 3a and 3b capture and which are acquired via the input unit 11b (step S21).

Subsequently, the imaging area detecting unit 15 pastes information of the angles of view 42a and 42b on the first image captured by the first camera 2 (step S22). Then, the imaging area detecting unit 15 extracts a non-imageable area 43 of the second cameras 3a and 3b on the basis of the information of the angles of view 42a and 42b pasted onto the first image (step S23).

After that, the imaging area detecting unit 15 checks the luminance values of the non-imageable area 43, and selects a camera that is able to capture the luminance values of the non-imageable area 43 from among the second cameras 3a and 3b (step S24). In step S24, for example, the second camera 3a or 3b that is able to capture the non-imageable area 43 is selected on the basis of the luminance histograms shown in FIG. 11 to FIG. 13.

Then, the camera parameter of the second camera 3a or 3b of which the luminance values fall within the imageable area is changed (step S25). Here, as a changed camera parameter, a zoom rate is changed to change the angle of view. Then, even the non-imageable area 43 may be captured at the angle of view 42' that is obtained by expanding the angle of view 42a. Note that the changeable camera parameter includes information, such as imaging direction and focus.

Next, an example of a process of changing a camera parameter will be described with reference to FIG. 18 to FIG. 26. In FIG. 18 to FIG. 26, areas captured by the second cameras 3a and 3b are changed on the basis of frequencies (for example, fineness of the waveform (patterns, and the like) of an image) included in a subject. Here, because the first camera 2 captures a wide range, a captured image does not include a high-frequency component. Thus, the second camera 3a or 3b that is able to capture a high-frequency component is selected, and it may be necessary to change the camera parameter appropriately. The camera parameter in this embodiment includes information for changing a zoom rate.

Figure 18:
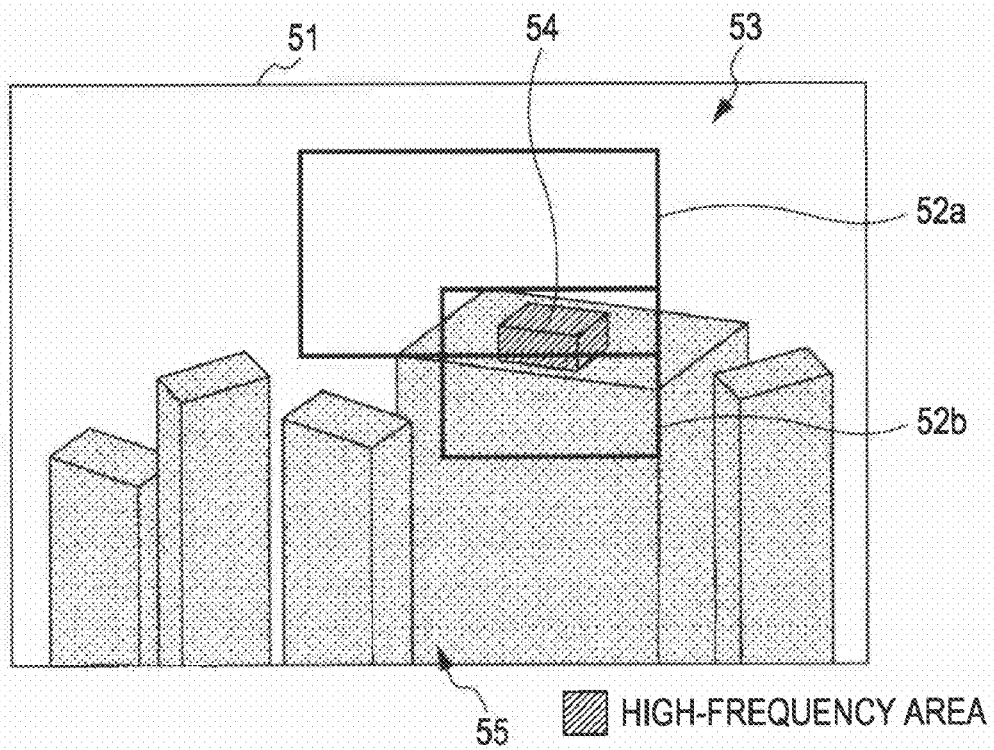
FIG. 18 is a view that illustrates an example of a subject that includes an object in a high-frequency area in the embodiment of the invention.

FIG. 18 shows an example of an image in which part of a subject includes a high-frequency area. FIG. 18 includes sky 53, a building 54 having a fence and a plurality of buildings 55 as a subject. In this embodiment, the first camera 2 generates an image of the entire subject captured at a first angle of view 51. In addition, the second cameras 3a and 3b generate images captured at second angles of view 52a and 52b that are narrower than that of the first camera 2. The building 54 has a pattern (fence in this embodiment) of which dark and light changes at predetermined intervals, so the building 54 includes a high frequency as compared with the sky 53 and the buildings 55. Thus, it is difficult for only the first camera 2 to capture the patterns of the building 54.

Figure 19:
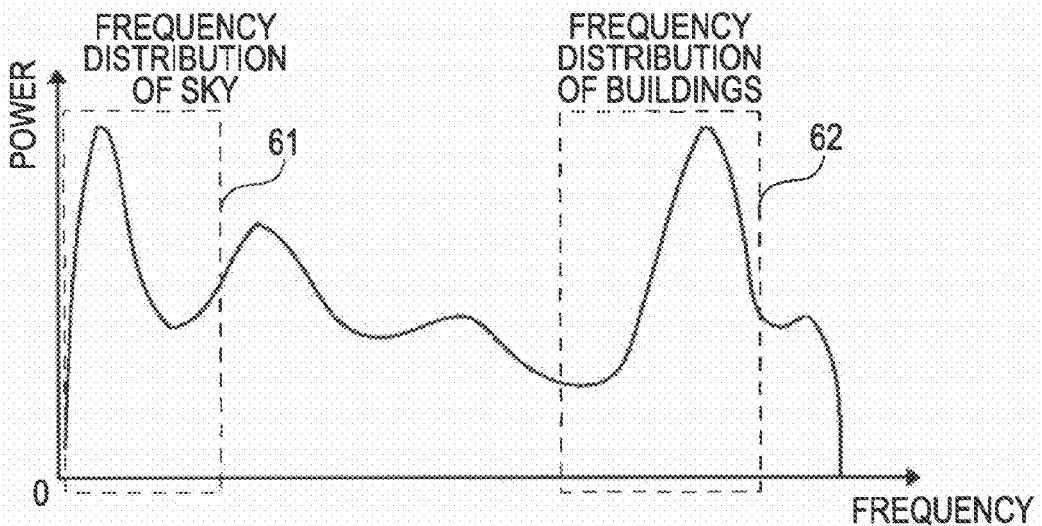
FIG. 19 is a view that illustrates an example of a frequency distribution of a subject in the embodiment of the invention.

FIG. 19 shows an example of a frequency distribution of the sky 53 and buildings 55 that are included in the subject shown in FIG. 18. As shown by the frequency distribution 61 of the sky 53, the frequency component of the sky 53 is low. On the other hand, as shown by the frequency distribution 62 of the buildings 55, the frequency component of the buildings 55 is high.

Figure 20:
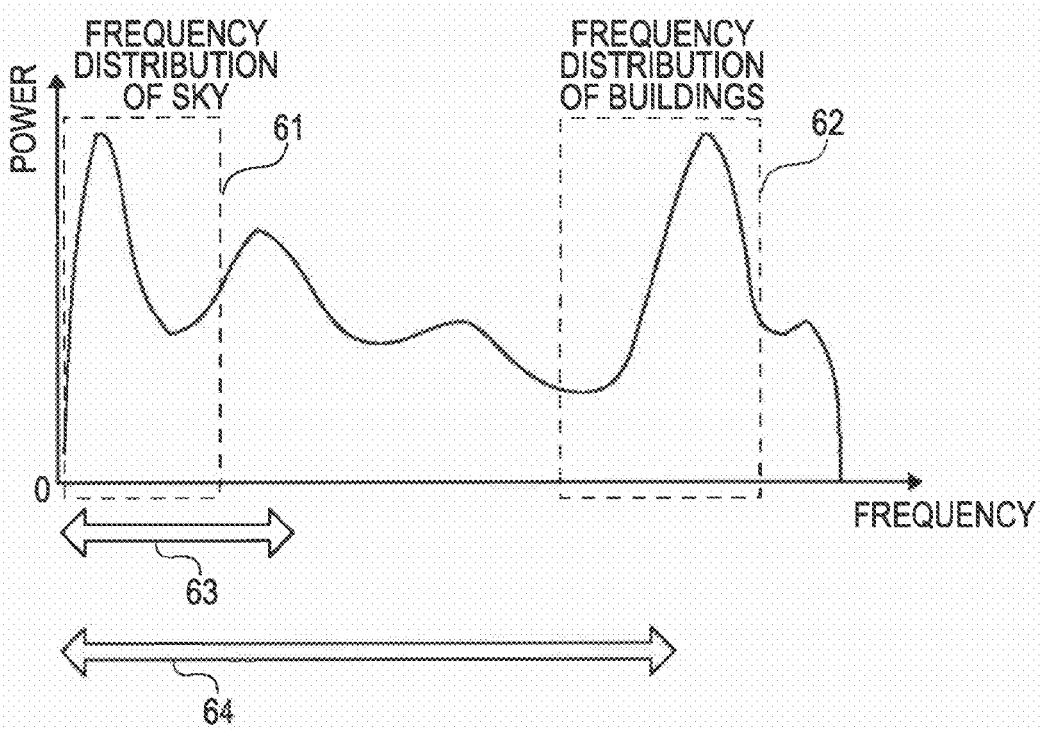
FIG. 20 is a view that illustrates an example of an imageable frequency range of one camera in the embodiment of the invention.

FIG. 20 shows an example of an imageable frequency range of a single camera. All the first camera 2 and the second cameras 3a and 3b have a substantially equal imageable frequency range 63. However, when the second cameras 3a and 3b are zoomed, an imageable frequency range 64 is wider than the frequency range 63. Thus, it is possible to capture an image of a further fine texture (high frequency). However, when the second cameras 3a and 3b are zoomed, the angles of view become small as compared with the angles of view before being zoomed.

Figure 21:
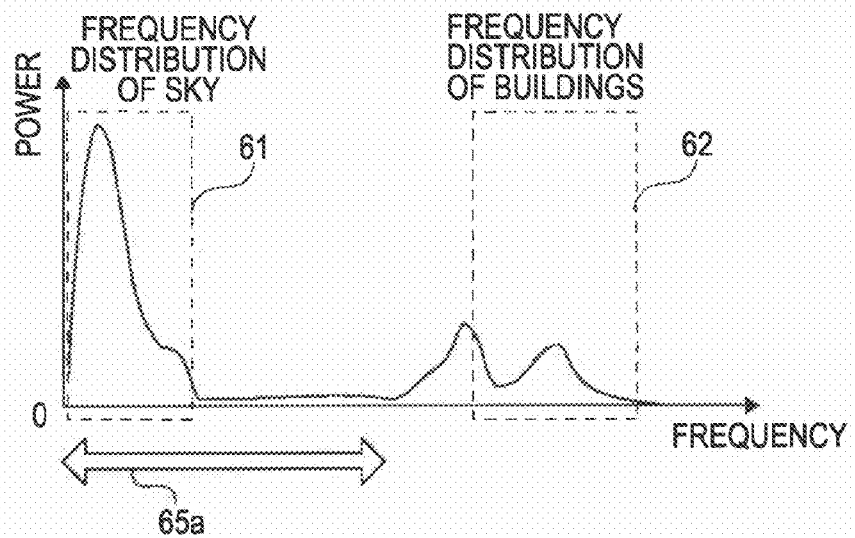
FIG. 21 is a view that illustrates an example of an imageable frequency range of a second camera before being zoomed in the embodiment of the invention.

FIG. 21 shows an example of an imageable frequency range of the second camera 3a before being zoomed. The second camera 3a is able to capture an image of a low-frequency component as shown in an imageable range 65a.

Figure 22:
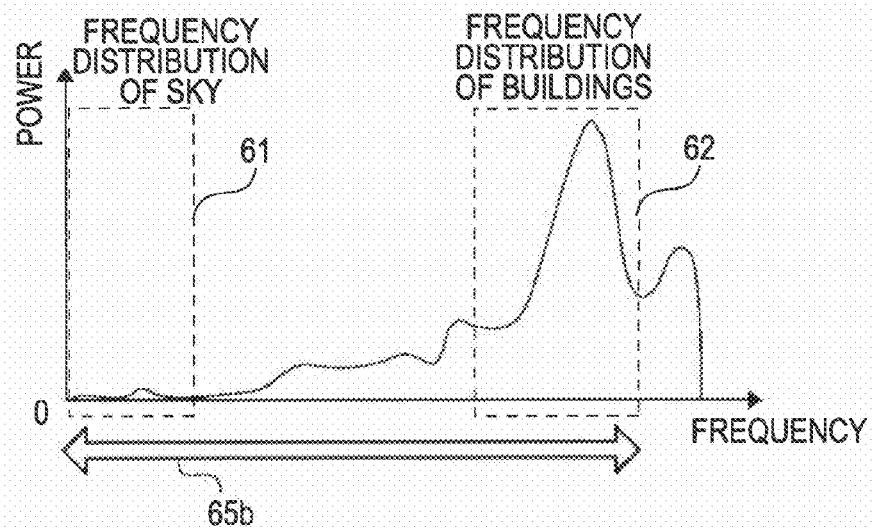
FIG. 22 is a view that illustrates an example of an imageable frequency range of a second camera after being zoomed in the embodiment of the invention.

FIG. 22 shows an example of an imageable frequency range of the second camera 3b after being zoomed. The second camera 3b is able to capture an image of a high-frequency component as shown in the imageable range 65b. Thus, an image captured by the second camera 3b has a high resolution, and is able to capture a fine pattern, or the like.

Figure 23:
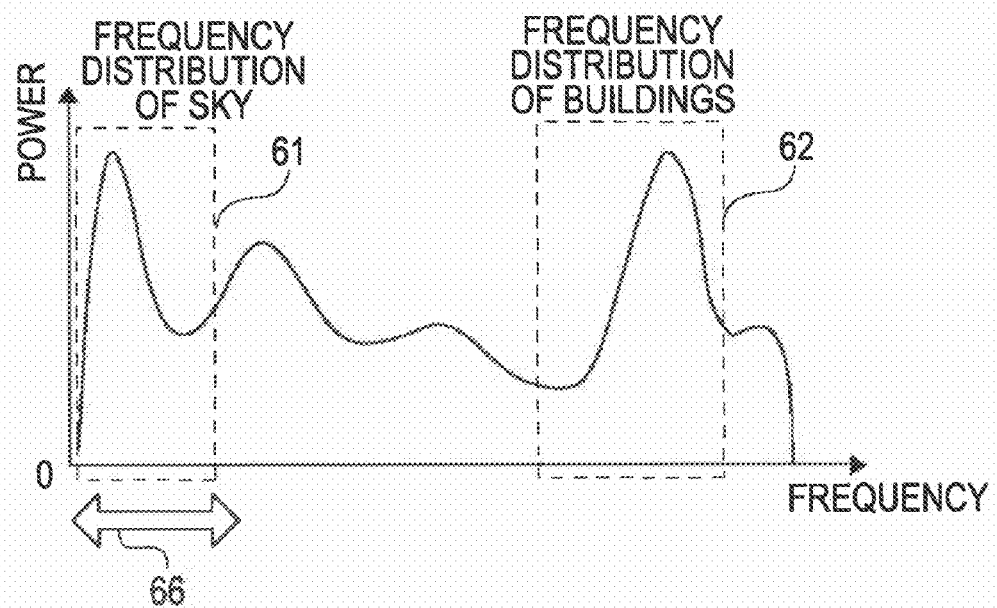
FIG. 23 is a view that illustrates an example of an imageable frequency range of a first camera in the embodiment of the invention.

FIG. 23 shows an example of an imageable frequency range of the first camera 2. The first camera 2 captures a subject in a wide range. Then, an imageable frequency range 66 of the first camera 2 is substantially equal to the frequency distribution 61 of the sky 53. That is, the first camera 2 has set an extremely low zoom rate, so a captured image has a low resolution (low frequency), and it is difficult for the first camera 2 to capture a fine pattern, or the like.

Figure 24A:
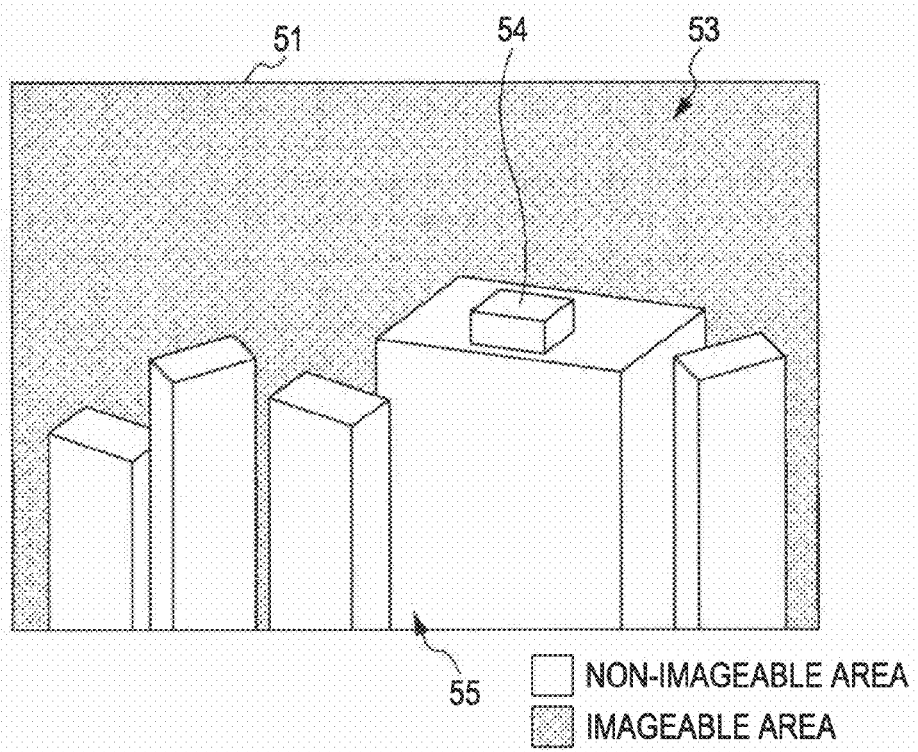
FIG. 24A to FIG. 24C are views that illustrate examples of angles of view, imageable areas and non-imageable areas of the first and second cameras in the embodiment of the invention.
Figure 24B:
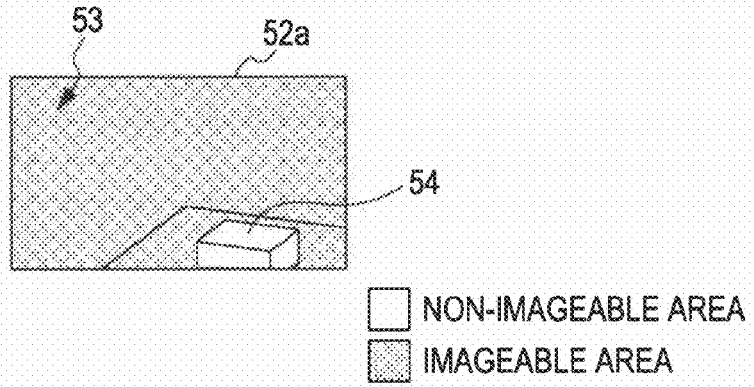
Figure 24C:
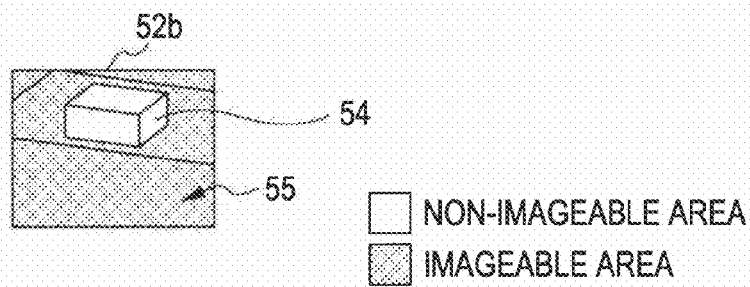

FIG. 24A to FIG. 24C show examples of angles of view of cameras and imageable and non-imageable areas. FIG. 24A shows an example of the angle of view 51 and imageable and non-imageable areas of the first camera 2. FIG. 24B shows an example of the angle of view 52a and imageable and non-imageable areas of the second camera 3a. FIG. 24C shows an example of the angle of view 52b and imageable and non-imageable areas of the second camera 3b.

The images of the subject included in the angles of view 51, 52a and 52b are equivalent to the images of the subject shown in FIG. 18. As shown in FIG. 24A to FIG. 24C, it turns out that it is difficult to capture the building 54 that includes a high-frequency area even with any of the cameras.

Incidentally, in order to synthesize the images captured by the cameras, it may be necessary to obtain information of the imageable frequency ranges of the cameras. Here, a process of changing the angle of view of a camera will be described with reference to FIG. 25 and FIG. 26.

Figure 25:
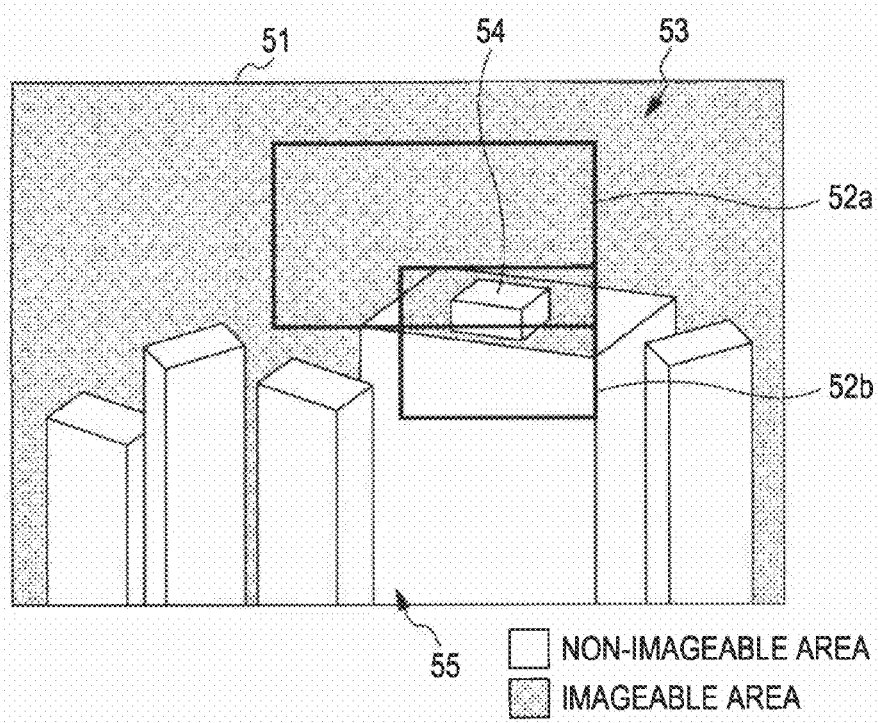
FIG. 25 is a view that illustrates an example of an angle of view, an imageable area and non-imageable area of a second camera before being zoomed in the embodiment of the invention.

FIG. 25 shows an example of angles of view of the second cameras 3a and 3b before being zoomed. The angle of view 52a of the second camera 3a and the angle of view 52b of the second camera 3b are equivalent to those shown in FIG. 18. Incidentally, the building 54 that includes a high-frequency area is included in a portion at which the angle of view 52b of the second camera 3b overlaps the angle of view 52a of the second camera 3a. Therefore, it is difficult to clearly capture the pattern of the building 54. In order to capture the building 54 in high resolution, it is only necessary that any of the second cameras 3a and 3b is zoomed. In this embodiment, because the second camera 3*b* is able to capture a subject of the highest frequency range (see FIG. 22), the zoom rate of the second camera 3*b* is changed to change the camera parameter that changes the angle of view. The camera parameter includes information for changing the angle of view.

Figure 26:
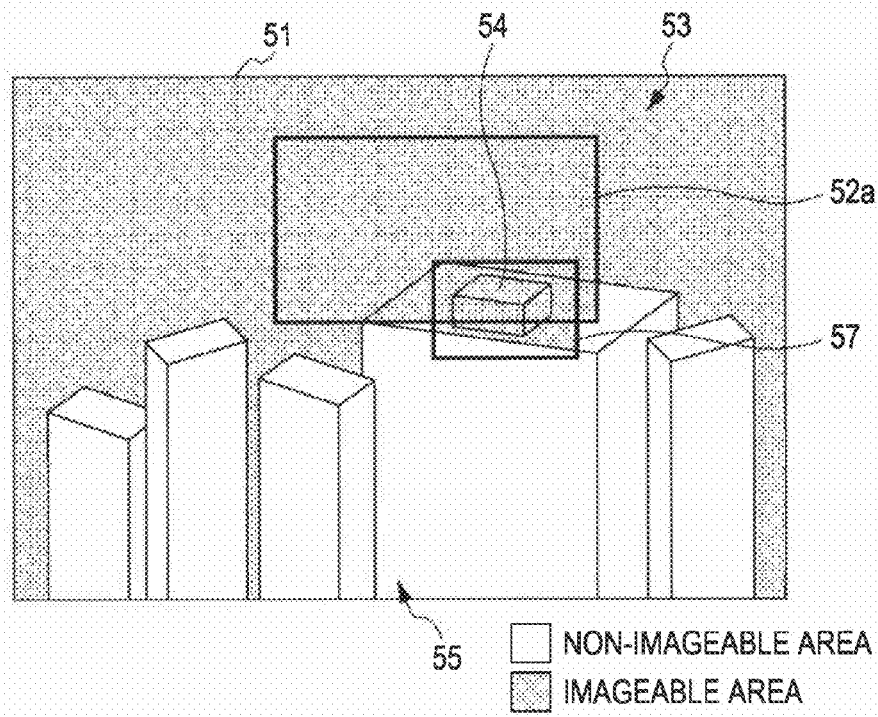
FIG. 26 is a view that illustrates an example of an angle of view, an imageable area and non-imageable area of a second camera after being zoomed in the embodiment of the invention.

FIG. 26 shows an example of the angle of view of the zoomed second camera 3*b*. Here, an angle of view 57 of the second camera, obtained by zooming the angle of view 52*b* of the second camera 3*b*, is shown. It appears that the angle of view 57 is narrower than the angle of view 52*b* (see FIG. 25). By zooming the second camera 3*b* in this way, it is possible to capture the building 54 that includes the high-frequency area as shown in FIG. 25 in high resolution.

Here, an example of the configuration of the second cameras 3*a* and 3*b* and an example of processed image when a high-frequency area included in a subject is detected will be described with reference to FIG. 27 to FIG. 31C.

Figure 27:
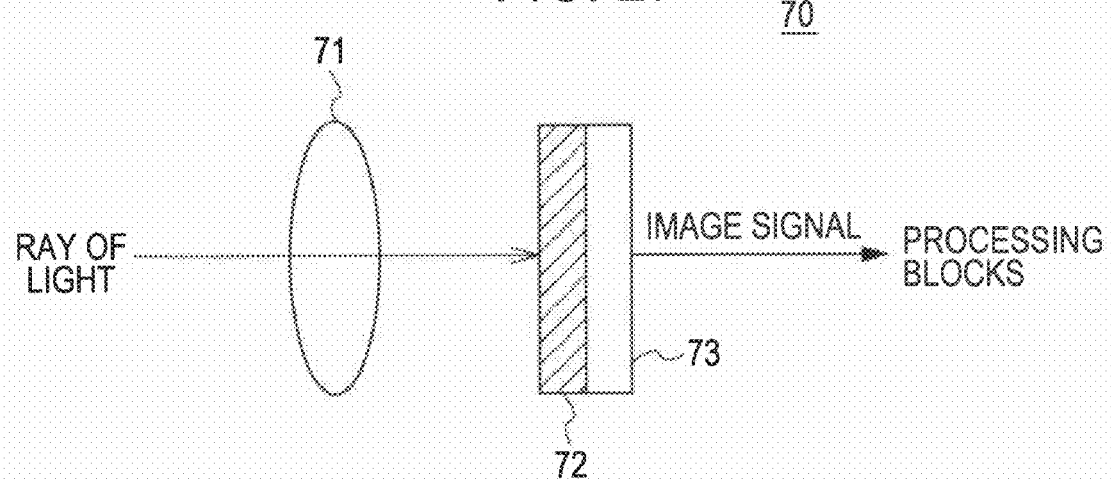
FIG. 27 is a block diagram that shows an example of the configuration of a first camera and second camera in the embodiment of the invention.

FIG. 27 shows an example of the configuration of an imaging unit 70 of each of the first camera 2 and the second cameras 3*a* to 3*c*. The imaging unit 70 includes a lens 71, a low-frequency separation unit (optical LPF: Low Pass Filter) 72 and an imaging device (CCD, CMOS, or the like) 73. A ray of light emitted from a subject passes the lens 71, and a ray of light of a low-frequency component is extracted by the low-pass filter 72. The ray of light of a low-frequency component is converted into an image signal by the imaging device 73, and is supplied to the processing blocks of each of the first camera 2 and the second cameras 3*a* to 3*c*. Note that a high-frequency area included in a subject may be detected using the technique, such as two-dimensional Fourier transform and DCT (Discrete Cosine Transform).

(1) In the Case of Analyzing Image Component

Figure 28:
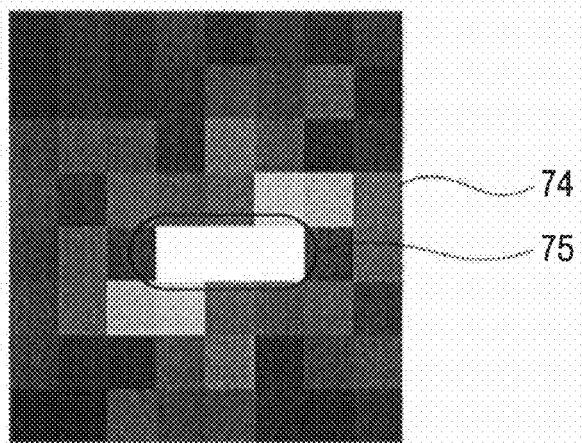
FIG. 28 is a view that illustrates an example of a two-dimensional Fourier transformed image in the embodiment of the invention.

First, an example of a process of detecting a high-frequency area by analyzing an image component by the imaging area detecting unit 15 will be described. FIG. 28 shows an example of an image to which two-dimensional Fourier transform is applied. First, the imaging area detecting unit 15 divides the image in units of 8×8 blocks and then applies two-dimensional Fourier transform to the image. Referring to a transformed image 74, it turns out that there is an area having a frequency higher than a predetermined threshold around a portion 75 having a low frequency. That is, the white blocks are areas having a frequency lower than the predetermined threshold.

Figure 29A:
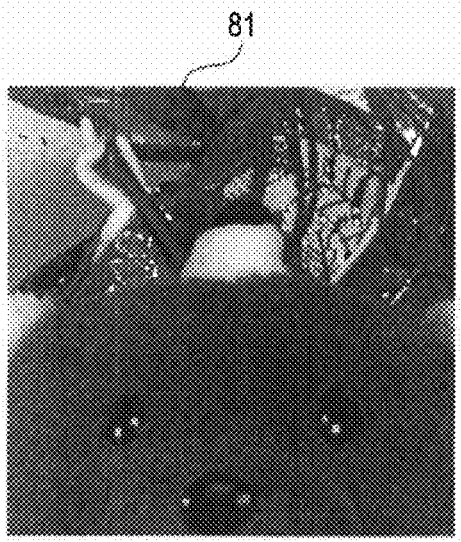
FIG. 29A to FIG. 29D are views that illustrate examples of images in steps in a process of detecting a high-frequency area in the embodiment of the invention.
Figure 29B:
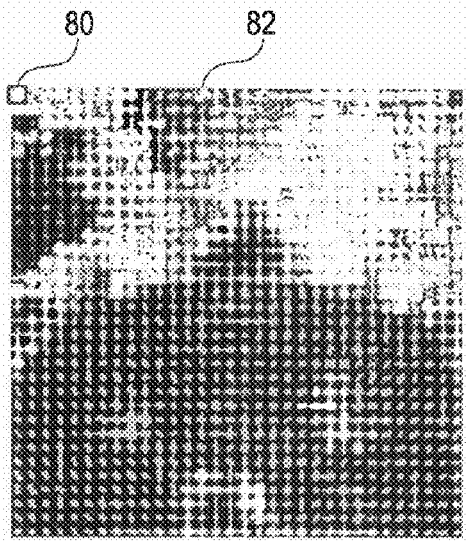

FIG. 29A to FIG. 29D show examples of images in steps in a process of detecting a high-frequency area. FIG. 29A shows an example of an original image 81. The original image includes a stuffed toy bear and an image of part of a kimono put on a doll. Note that the original image 81 is obtained without passing through the low-pass filter 72. FIG. 29B shows an example of an image 82 for which two-dimensional fast Fourier transform (FFT) is applied over the entire original image 81 in units of 8×8 blocks. Here, 8×8 blocks shown in FIG. 28 are shown at a block 80. From the image 82, it appears that it is white around a fine pattern kimono, and a high-frequency component is included around here.

Figure 29C:
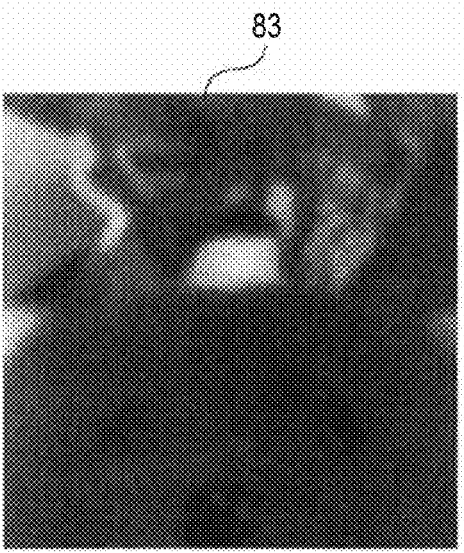
Figure 29D:
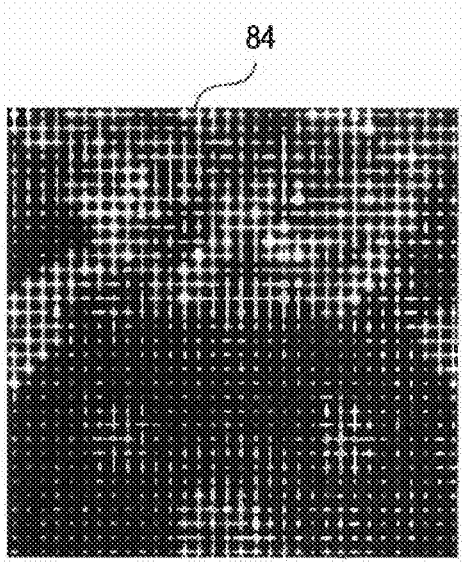

FIG. 29C shows an example of a low-frequency image 83 that is obtained by applying the low-pass filter 72 to the original image 81. Because the low-frequency image 83 is formed only of a low-frequency component, it is unclear entirely. FIG. 29D shows an example of the image 82 to which two-dimensional fast Fourier transform is applied in units of 8×8 blocks of the low-frequency image 83 to which the low-pass filter 72 is applied. In this case as well, from the image 82, it appears that it is white around a fine pattern kimono, and a high-frequency component is included around here.

Figure 30A:
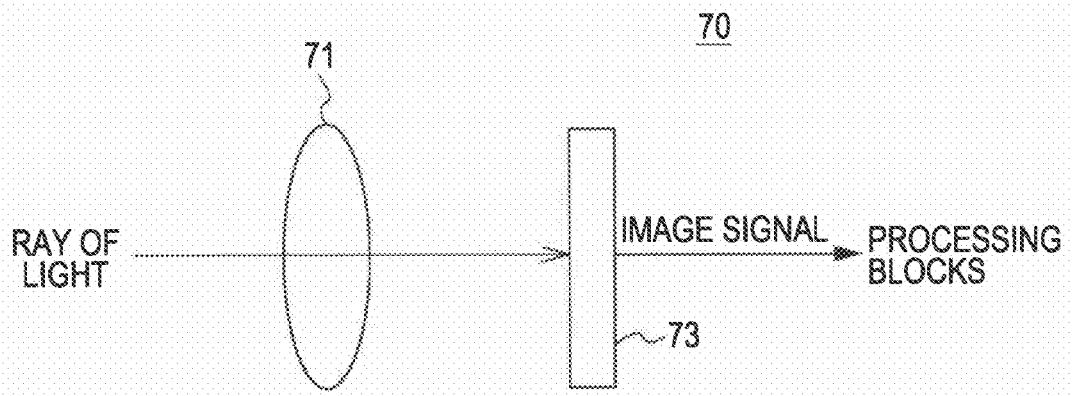
FIG. 30A and FIG. 30B are block diagrams that show examples of the configuration of each of the first and second cameras in the embodiment of the invention.
Figure 30B:
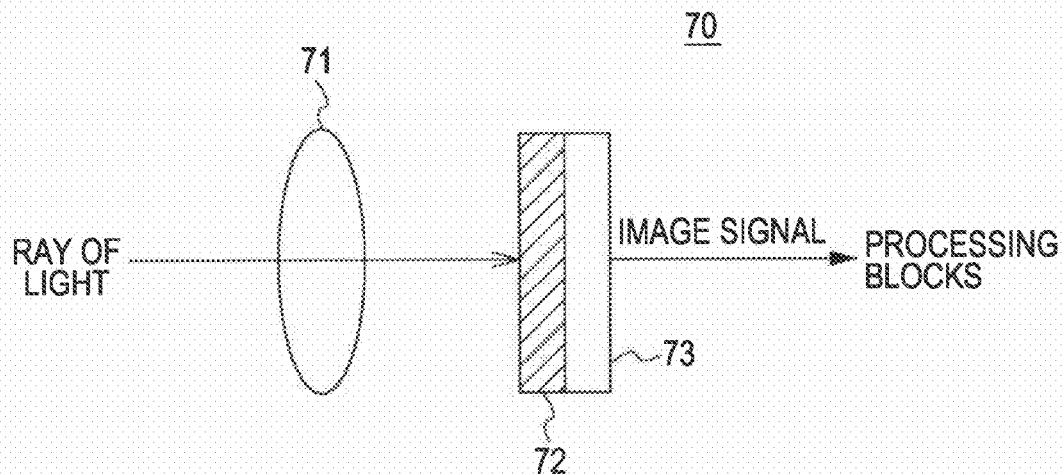

(2) In the Case of Obtaining Difference Image Obtained by Subtracting Low-frequency Component from Original Image FIG. 30A and FIG. 30B show examples of the configuration of the imaging unit 70 of each of the first camera 2 and the second cameras 3*a* to 3*c*. The configuration of each block is similar to the example of the configuration shown in FIG. 27, so the detailed description is omitted. FIG. 30A is an example of the configuration when the low-pass filter 72 is off. In this case, the original image 81 is obtained. FIG. 30B is an example of the configuration when the low-pass filter 72 is on. In this case, the low-frequency image 83 is obtained.

Figure 31A:
FIG. 31A to FIG. 31C are views that illustrate examples of images in steps in a process of detecting a high-frequency area in the embodiment of the invention.
Figure 31B:
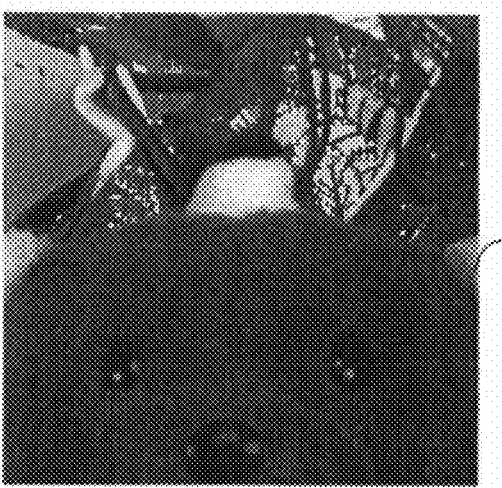
Figure 31C:
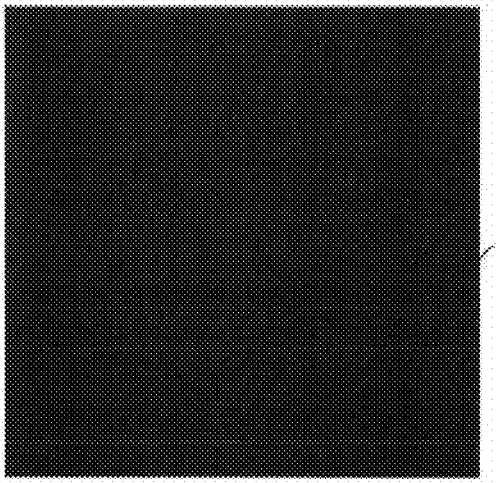

FIG. 31A to FIG. 31C show examples of images in steps in a process of detecting a high-frequency area. FIG. 31A is an example of the original image 81 obtained when the low-pass filter 72 is off. In this case, because the original image 81 includes a high-frequency component, the pattern of a kimono, or the like, is also clearly shown. FIG. 31B is an example of the image 82 obtained when the low-pass filter 72 is on. In this case, because the image 82 includes only a low-frequency component that is lower than a predetermined threshold, the image 82 is unclear overall. FIG. 31C shows an example of the difference image 83. In this case, the difference image 84 includes only a frequency component that is higher than a predetermined threshold by subtracting the image 82 from the original image 81. As a result, it is possible to detect a high-frequency component included in a subject from the difference image 84.

Then, the zoom rate calculation unit 16*b* supplies the camera parameter that includes the changed zoom rate to a selected one of the second cameras 3*a* and 3*b* on the basis of the information of the detected high-frequency area. As a result, by changing the zoom rate of the second camera 3*a* or 3*b*, it is possible to capture a subject in a high-frequency area by narrowing the angle of view.

With the signal processing apparatus 10 according to the above described embodiment, the second images 6*a* to 6*c* captured by the second cameras 3*a* to 3*c* are pasted onto the first image 5 captured by the first camera 2 to generate a synthesized image. When the synthesized image is generated, the image information correction unit 14 supplies information about luminance and chromaticity to the similar portion detecting unit 12 to ensure a process of detecting a similar portion. In addition, the imaging area detecting unit 15 obtains the imageable area and non-imageable area of each of the first camera 2 and second cameras 3*a* to 3*c*. The information of the imageable areas and non-imageable areas obtained here is supplied to the similar portion detecting unit 12 to further improve reliability of a process of detecting a similar portion.

In addition, by supplying the information of the imageable areas and non-imageable areas detected by the imaging area detecting unit 15 to the camera parameter calculation unit 16, it is possible to increase the accuracy when the camera parameters of the second cameras 3*a* to 3*c* are changed.

In addition, it is possible to perform capturing by assigning the attributes (resolution, eyepoint, color, luminance and focus) of the cameras 3*a* to 3*c*. Then, when a new image is synthesized from a plurality of images captured by the cameras 3*a* to 3*c* of which the attributes (resolution, eyepoint, color, luminance and focus) are different, the detailed camera parameter information in each image is used among the images. As a result, the high-resolution synthesized image is obtained from the first image 5 and the second images 6*a* to 6*c*. At this time, to paste only the high-frequency components of the second images 6*a* to 6*c* onto the low-frequency component of the first image 5, the images are synthesized naturally using the chromaticness of the first image 5. Then, the synthesized image generated in the present embodiment may be any one of a static image and a dynamic image.

In addition, even when the eyepoints of the plurality cameras do not coincide with one another, individual information with respect to common information may be acquired for each of the second cameras 3a to 3c. Then, to adjust the camera parameter on the basis of the individual information, a synthesized image in which the images are smoothly pieced is obtained. Thus, there are no limitations on the number of second cameras 3a to 3c or restrictions on the arrangement.

In addition, when only the first camera 2 is used to capture a subject having a large difference in luminance, the obtained first image 5 does not accurately capture portions of a low luminance or a high luminance. However, these portions may be complemented by the second images 6a to 6c captured by the second cameras 3a to 3c. Thus, the obtained synthesized image is a multiple-grayscale (high dynamic range) image.

Note that, in the signal processing apparatus according to the above described embodiment, multiple number of the structures may be stacked, and it is possible to perform capturing in high resolution as long as the mechanism of the camera is allowed. Here, another embodiment will be described with reference to FIG. 32.

Figure 32:
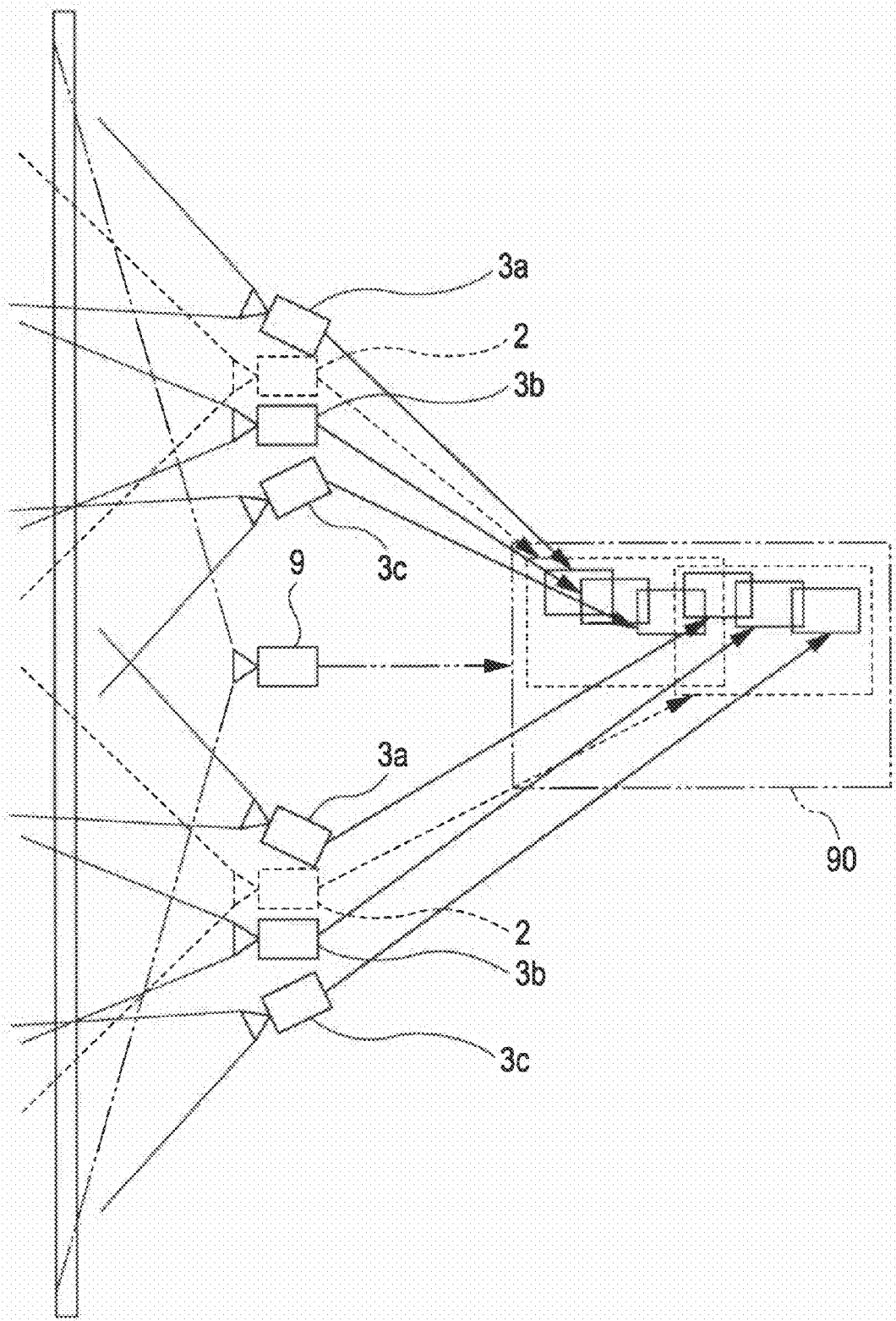
FIG. 32 is a view that illustrates an example of arrangement of a plurality of camera units in another embodiment of the invention.
Figure 33:
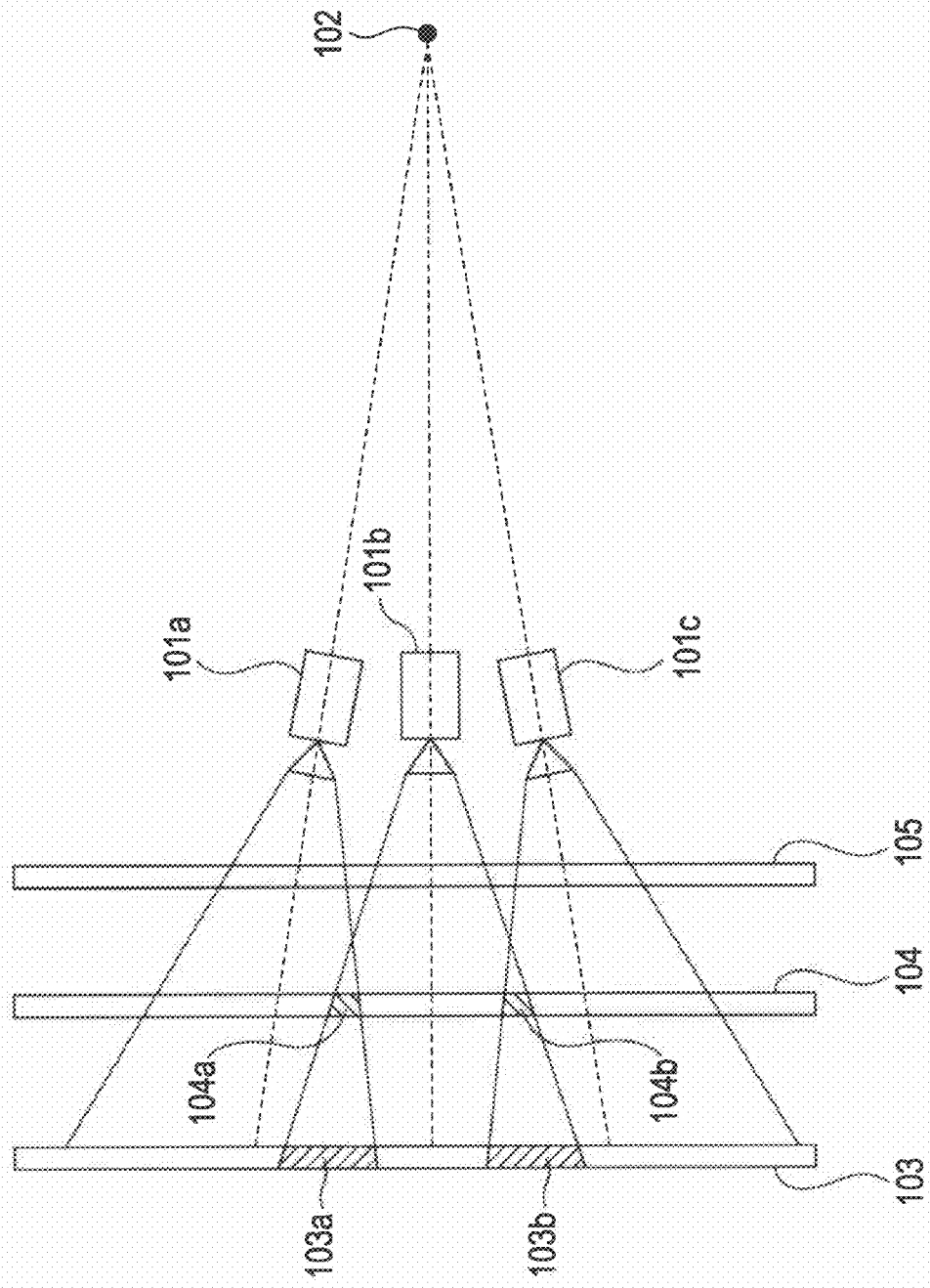
FIG. 33 is a view that illustrates an example of arrangement of cameras in an existing single eyepoint method.

FIG. 32 shows an example of arrangement of a plurality of camera units. When a set of the first camera 2 and the second cameras 3a to 3c shown in FIG. 1 is one unit, a plurality of units are arranged. In this embodiment, a third camera 9 that captures a subject at an angle of view wider than that of the first camera 2 is further provided. However, the basic operation is similar to the case in which the one unit formed of the first camera 2 and the second cameras 3a to 3c is used. At this time, with respect to an angle of view 90 at which the third camera 9 captures as a reference, each unit performs capturing in a state where a deviation with respect to the angle of view 90 is corrected and synthesized images are arranged. Then, a high-resolution synthesized image with a multi-stage configuration may be obtained. Thus, it is advantageous in that a stereo image that has a high resolution and no deformation may be obtained.

In addition, a series of processes in the above described embodiments may be executed by hardware or may be executed by software. When the series of processes are executed by software, programs that constitute the software are installed onto a computer that is assembled to exclusive hardware or programs that constitute desired software are installed on, for example, a general-purpose computer that is able to execute various functions by installing various programs.

In addition, a recording medium that records a program code of software that implements the functions of the above described embodiments is supplied to a system or an apparatus, and, of course, the functions of the above described embodiments may be implemented by a computer (or a controller, such as a CPU) of the system or apparatus reads and executes a program code stored in the recording medium.

The recording medium for supplying the program code in this case may, for example, include a floppy disk, a hard disk, an optical disk, a magneto-optical disk, a CD-ROM, a CD-R, a magnetic tape, a nonvolatile memory card, a ROM, and the like.

In addition, the embodiment of the invention not only includes the case where the functions of the above described embodiments are implemented by executing the program code read by the computer but also an OS, or the like, operating on the computer executes part of or the entire actual processes on the basis of an instruction of the program code, and then the functions of the above described embodiments are implemented by those processes.

Note that in the specification, steps that describes programs constituting software include not only processes executed in the written order in time sequence but also processes that are executed in parallel or separately even when the processes are not executed in time sequence.

Furthermore, the embodiment of the invention is not limited to the above described embodiments; of course, it may be modified into various forms without departing from the scope of the invention.

The present application contains subject matter related to that disclosed in Japanese Priority Patent Application JP 2008-169445 filed in the Japan Patent Office on Jun. 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
an input unit that receives a first image generated by a first camera that captures a subject included in a predetermined range at a first angle of view, and that receives a plurality of second images that are higher in resolution than the first image and generated by a plurality of second cameras, each of which captures part of the subject included in the predetermined range at a second angle of view that is narrower than the first angle of view;
a similar portion detecting unit that detects a similar portion between part of the subject included in the first image and a subject included in each of the second images;
an image synthesizing unit that pastes the second images at positions corresponding to the detected similar portions within the first image to generate a synthesized image;
an imaging area detecting unit that detects an area, for which image information is insufficient in the first image and is difficult to complement by the second cameras, as a non-imageable area from the synthesized image; and
a camera parameter calculation unit that changes a camera parameter for controlling the second camera that captures the second image by which the image information insufficient in the first image is complemented.

2. The signal processing apparatus according to claim 1, wherein
the imaging area detecting unit obtains a luminance distribution or frequency distribution of each of the subjects included respectively in the first and second images and detects the non-imageable area on the basis of image areas that can be captured by the first and second cameras.

3. The signal processing apparatus according to claim 2, wherein
the camera parameter calculation unit includes:
a luminance calculation unit that obtains luminance distributions of the subjects to detect luminance ranges that can be imaged by the first and second cameras and that makes the camera parameter include information for changing a zoom rate; and
a zoom rate calculation unit that obtains frequency distributions of the subjects to detect the non-imageable area on the basis of frequency areas that can be captured by the first and second cameras and that makes the camera parameter include information for changing a zoom rate.

4. The signal processing apparatus according to claim 3, wherein
the imaging area detecting unit applies two-dimensional fast Fourier transform to a low-frequency image extracted by a low-frequency extracting unit, which passes a ray of light of a low-frequency component, from a ray of light that penetrates through a lens of each second camera to detect an area of which the frequency is higher than a predetermined threshold and which is included in the low-frequency image.

5. The signal processing apparatus according to claim 3, wherein
the imaging area detecting unit detects an area of which the frequency is higher than a predetermined threshold and which is included in the second image on the basis of a difference image that is obtained by subtracting a frequency component of a low-frequency image extracted by a low-frequency extracting unit, which passes a ray of light that penetrates through a lens of each second camera, from a frequency component of the second image.

6. The signal processing apparatus according to claim 1, further comprising:
an image information correction unit that corrects image information included in the synthesized image on the basis of the image information which is included in each of the first and second images and which includes at least any one of a luminance or a frequency.

7. The signal processing apparatus according to claim 1, wherein
the similar portion detecting unit detects the similar portions on the basis of the image information corrected by the image information correction unit and the non-imageable area and imageable area detected by the imaging area detecting unit.

8. The signal processing apparatus according to claim 1, wherein
the camera parameter calculation unit obtains information related to at least any one of color, luminance and focus as the camera parameter by which the amount of characteristic of the plurality of low-frequency images with respect to the first image is determined pixel by pixel, manages the camera parameter as common information using the first camera as a reference, and manages information of the plurality of second cameras with respect to the common information as individual information.

9. A signal processing method comprising the steps of:
receiving a first image generated by a first camera that captures a subject included in a predetermined range at a first angle of view, and receiving a plurality of second images that are higher in resolution than the first image and generated by a plurality of second cameras, each of which captures part of the subject included in the predetermined range at a second angle of view that is narrower than the first angle of view;
detecting a similar portion between part of the subject included in the first image and a subject included in each of the second images;
pasting the second images at positions corresponding to the detected similar portions within the first image to generate a synthesized image;
detecting an area, for which image information is insufficient in the first image and is difficult to complement by the second cameras, as a non-imageable area from the synthesized image; and
changing a camera parameter for controlling the second camera that captures the second image by which the image information insufficient in the first image is complemented.

10. A program for causing a computer to execute a process comprising the steps of:
receiving a first image generated by a first camera that captures a subject included in a predetermined range at a first angle of view, and receiving a plurality of second images that are higher in resolution than the first image and generated by a plurality of second cameras, each of which captures part of the subject included in the predetermined range at a second angle of view that is narrower than the first angle of view;
detecting a similar portion between part of the subject included in the first image and a subject included in each of the second images;
pasting the second images at positions corresponding to the detected similar portions within the first image to generate a synthesized image;
detecting an area, for which image information is insufficient in the first image and is difficult to complement by the second cameras, as a non-imageable area from the synthesized image; and
changing a camera parameter for controlling the second camera that captures the second image by which the image information insufficient in the first image is complemented.

11. A recording medium that records the program according to claim 10.

* * * * *